US012780233B2

(12) United States Patent
Kume et al.

(10) Patent No.: US 12,780,233 B2
(45) Date of Patent: Nov. 3, 2026

(54) PRESENTATION CONTROL DEVICE, AUTOMATIC DRIVING CONTROL DEVICE, AND STORAGE MEDIUM STORING PROGRAM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 140 days.

(21) Appl. No.: 18/780,695

(22) Filed: Jul. 23, 2024

(65) Prior Publication Data

US 2024/0375674 A1 Nov. 14, 2024

Related U.S. Application Data

(63) Continuation of application No. PCT/JP2022/045359, filed on Dec. 8, 2022.

(30) Foreign Application Priority Data

Jan. 31, 2022 (JP) ................................ 2022-012732
Nov. 10, 2022 (JP) ................................ 2022-180402

(51) Int. Cl.

*B60W 50/14* (2020.01)
*B60K 35/10* (2024.01)

(Continued)

(52) U.S. Cl.

CPC ............ *B60W 50/14* (2013.01); *B60K 35/10* (2024.01); *B60K 35/22* (2024.01); *B60K 35/23* (2024.01);

(Continued)

(58) Field of Classification Search

CPC ........... B60W 30/18163; B60W 50/14; B60W 50/16; B60W 2050/143; B60W 2050/146;

(Continued)

(56) References Cited

U.S. PATENT DOCUMENTS 11,524,689 B2 * 12/2022 Hayakawa .......... B60W 40/105
12,030,500 B2 * 7/2024 Kanoh ............ B60W 30/18163

(Continued)

FOREIGN PATENT DOCUMENTS

JP 2009149123 A 7/2009
JP 2010018184 A 1/2010

(Continued)

*Primary Examiner* — Logan M Kraft
(74) *Attorney, Agent, or Firm* — Harness, Dickey & Pierce, P.L.C.

(57) ABSTRACT

A presentation control device is used in a subject vehicle capable of traveling by autonomous travel control and controls presentation of information related to the autonomous travel control. The presentation control device is configured to grasp a plan of automatic lane change made by the autonomous travel control and, when a plurality of times of lane change are planned within a predetermined section or within a predetermined time, notify of an execution plan of the plurality of times of the automatic lane change in accordance with a first automatic lane change.

28 Claims, 21 Drawing Sheets

(51) Int. Cl.

| | |
|---|---|
| ***B60K 35/22*** | (2024.01) |
| ***B60K 35/23*** | (2024.01) |
| ***B60K 35/26*** | (2024.01) |
| ***B60K 35/28*** | (2024.01) |
| ***B60K 35/50*** | (2024.01) |
| ***B60K 35/60*** | (2024.01) |
| ***B60K 35/81*** | (2024.01) |
| ***B60K 35/90*** | (2024.01) |
| ***B60W 60/00*** | (2020.01) |
| ***B62D 15/02*** | (2006.01) |

(52) U.S. Cl.

CPC ............ *B60K 35/265* (2024.01); *B60K 35/28* (2024.01); *B60K 35/50* (2024.01); *B60K 35/60* (2024.01); *B60K 35/81* (2024.01); *B60K 35/90* (2024.01); *B60W 60/001* (2020.02); *B62D 15/0255* (2013.01)

(58) Field of Classification Search

CPC ............ B60W 60/001; B60W 60/0059; B62D 15/0255; B60K 35/81; B60K 35/28; B60K 35/50; B60K 35/10; B60K 35/60; B60K 35/22; B60K 35/265; B60K 35/90

USPC ............................................................ 701/41

See application file for complete search history.

(56) References Cited

U.S. PATENT DOCUMENTS

| | | | | |
|---|---|---|---|---|
| 2018/0052458 | A1 | 2/2018 | Tsuji et al. | |
| 2018/0074497 | A1 | 3/2018 | Tsuji et al. | |
| 2018/0093676 | A1 | 4/2018 | Emura et al. | |
| 2018/0105185 | A1 | 4/2018 | Watanabe et al. | |
| 2018/0105186 | A1 | 4/2018 | Motomura et al. | |
| 2019/0152525 | A1* | 5/2019 | Resch ................ | B62D 15/0255 |
| 2019/0168772 | A1 | 6/2019 | Emura et al. | |
| 2021/0323556 | A1* | 10/2021 | Matsumura ....... | B60W 60/0015 |
| 2021/0403028 | A1 | 12/2021 | Kashu et al. | |
| 2023/0286509 | A1 | 9/2023 | Kume et al. | |

FOREIGN PATENT DOCUMENTS

| | | | |
|---|---|---|---|
| JP | 2011162132 | A | 8/2011 |
| JP | 2018079702 | A | 5/2018 |
| JP | 2018173717 | A | 11/2018 |
| JP | 2020001697 | A | 1/2020 |
| JP | 2022011908 | A | 1/2022 |

* cited by examiner

PRESENTATION CONTROL DEVICE, AUTOMATIC DRIVING CONTROL DEVICE, AND STORAGE MEDIUM STORING PROGRAM

CROSS REFERENCE OF RELATED APPLICATIONS

The present application is a continuation application of International Patent Application No. PCT/JP2022/045359 filed on Dec. 8, 2022 which designated the U.S. and claims the benefit of priorities from Japanese Patent Application No. 2022-012732 filed on Jan. 31, 2022 and Japanese Patent Application No. 2022-180402 filed on Nov. 10, 2022. The entire disclosures of all of the above applications are incorporated herein by reference.

TECHNICAL FIELD

The disclosure in the present specification relates to an information presentation control technology and an automatic driving control technology.

BACKGROUND

A related art describes an automatic driving device that causes the subject vehicle to run along the road on which the subject vehicle is running. This automatic driving device is capable of exercising control to cause the subject vehicle to make a lane change from the lane along which the subject vehicle is presently running to another lane.

SUMMARY

A presentation control device is used in a subject vehicle capable of traveling by autonomous travel control and controls presentation of information related to the autonomous travel control. The presentation control device is configured to grasp a plan of automatic lane change made by the autonomous travel control and, when a plurality of times of lane change are planned within a predetermined section or within a predetermined time, notify of an execution plan of the plurality of times of the automatic lane change in accordance with a first automatic lane change.

DETAILED DESCRIPTION

Figure 1:
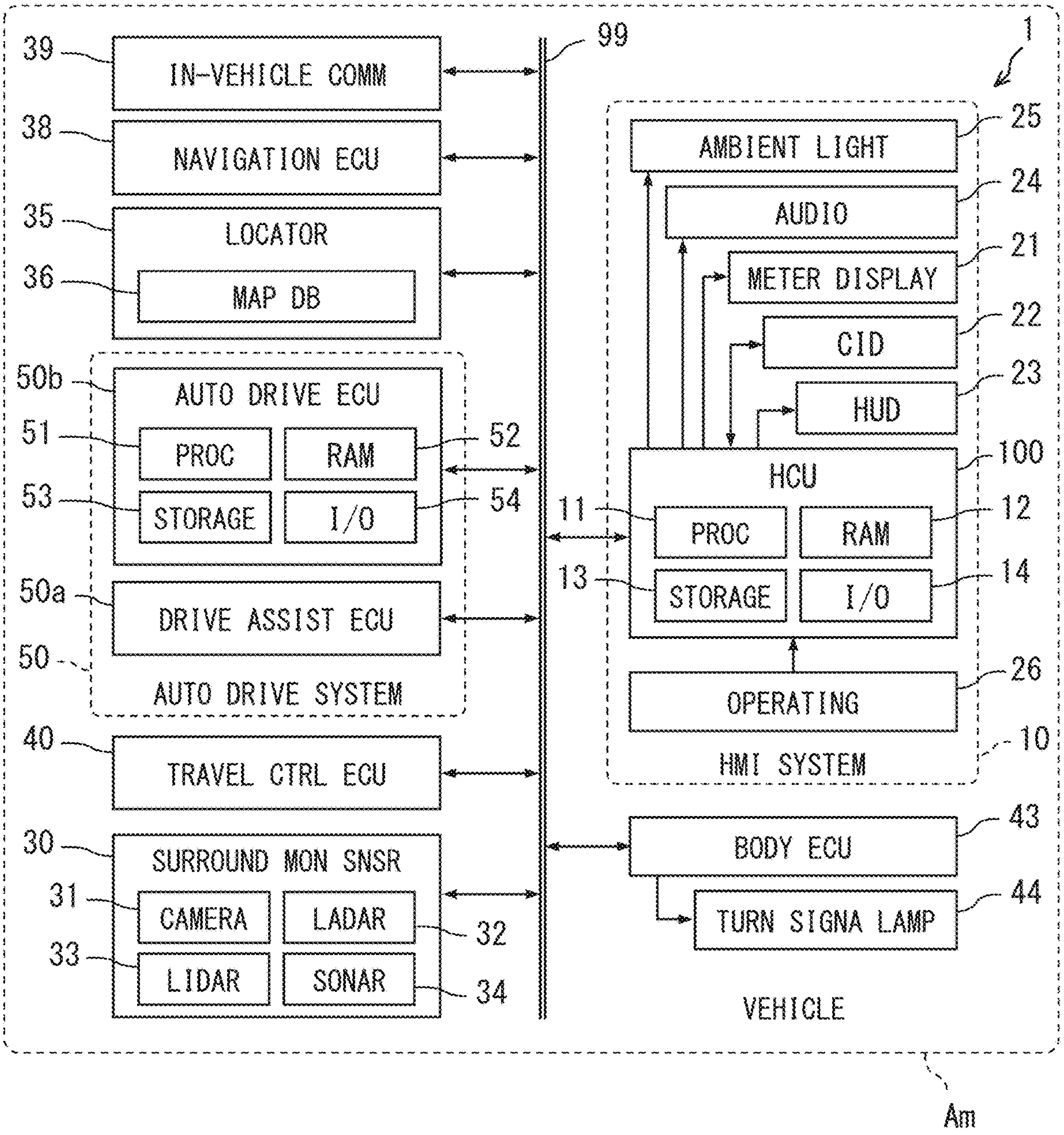
FIG. 1 is a drawing illustrating an overall view of an in-vehicle network including a HCU and an automatic driving ECU according to a first embodiment of the present disclosure.

Due to development of such an automatic driving device as described in a related art, recently, autonomous travel control in which a driver is not obligated to monitor the surroundings is being realized. According to such autonomous travel control, an automatic lane change can also be performed even in a situation in which a driver is not obligated to monitor the surroundings. However, when an automatic lane change is continuously made in a situation in which a driver is not obligated to monitor the surroundings, it is difficult for such an occupant as a driver to determine whether the plurality of times of automatic lane change is a behavior under normal control. As a result, a plurality of times of automatic lane change can cause anxiety in the occupant.

The present disclosure provides a presentation control device, a presentation control program, an automatic driving control device, and an automatic driving control program with which an occupant's anxiety can be suppressed, even when a plurality of times of automatic lane change are made.

According to one aspect of the present disclosure, a presentation control device that is used in a subject vehicle capable of traveling by autonomous travel control in which a driver is not obligated to monitor surroundings and controls presentation of information related to the autonomous travel control is provided. The presentation control device includes: a control grasping unit that is configured to grasp a plan of automatic lane change made by the autonomous travel control; and a notification implementation unit that is configured to, when a plurality of times of lane change are planned within a predetermined section or within a predetermined time, notify of an execution plan of the plurality of times of the automatic lane change in accordance with a first automatic lane change.

According to one aspect of the present disclosure, a non-transitory computer readable storage medium storing a presentation control program that is used in a subject vehicle capable of traveling by autonomous travel control in which a driver is not obligated to monitor surroundings and controls presentation of information related to the autonomous travel control is provided. The presentation control program causing at least one processing unit to perform processing includes steps of: grasping a plan of automatic lane change made by the autonomous travel control, and notifying of an execution plan of the plurality of times of the automatic lane change in accordance with a first automatic lane change when a plurality of times of the automatic lane change are planned within a predetermined section or within a predetermined time.

According to these aspects, when a plurality of times of automatic lane change are continued within a predetermined road section or a predetermined time period, such an occupant as a driver can grasp an execution schedule of a plurality of times of automatic lane change by notification made in tandem with a first automatic lane change. Therefore, the occupant can determine that the plurality of times of automatic lane change are a behavior under normal control. As a result, the occupant's anxiety can be suppressed even when a plurality of times of automatic lane change are made.

According to one aspect of the present disclosure, a presentation control device that is used in a subject vehicle capable of traveling by autonomous travel control in which a driver is not obligated to monitor surroundings and controls presentation of information related to the autonomous travel control is provided. The presentation control device includes: a control grasping unit that is configured to grasp a traveling plan generated at an automatic driving control device exercising the autonomous travel control; and a notification implementation unit that is configured to, when the traveling plan to make a plurality of times of lane change within a predetermined section or within a predetermined time is grasped, make driving requesting notification requesting the driver to perform a driving behavior.

According to one aspect of the present disclosure, a non-transitory computer readable storage medium storing a presentation control program that is used in a subject vehicle capable of traveling by autonomous travel control in which a driver is not obligated to monitor surroundings and controls presentation of information related to the autonomous travel control is provided. The presentation control program causing at least one processing unit to perform processing includes steps of: grasping a traveling plan generated at an automatic driving control device that exercises the autonomous travel control; and making driving requesting notification requesting the driver to perform a driving behavior when the traveling plan to make a plurality of times of lane change within a predetermined section or within a predetermined time is grasped.

According to these aspects, when a traveling plan to make a plurality of times of lane change within a predetermined road section or a predetermined time period is grasped, a driver is requested to perform a driving behavior by driving requesting notification. Therefore, the driver can determine that processing under normal control is being performed on the subject vehicle side through recognition of the driving requesting notification. As a result, anxiety of such an occupant as a driver can be suppressed even when a plurality of times of automatic lane change are made.

According to one aspect of the present disclosure, an automatic driving control device includes: a control switching unit that is configured to switch between driving assist control in which a driver is obligated to monitor surroundings and autonomous travel control in which the driver is not obligated to monitor the surroundings; and a lane change control unit that is configured to plan execution of automatic lane change of a subject vehicle by the autonomous travel control. When planning a plurality of times of the automatic lane change, the lane change control unit sets a wider interval from a first point at which a first automatic lane change is made to a second point at which a second automatic lane change is made than the interval taken when the plurality of times of the automatic lane change by the driving assist control are planned.

According to one aspect of the present disclosure, a non-transitory computer readable storage medium storing an automatic driving control program is provided. The automatic driving control program causing at least one processing unit to perform processing includes steps of: switching between driving assist control in which a driver is obligated to monitor surroundings and autonomous travel control in which the driver is not obligated to monitor the surroundings; planning execution of automatic lane change of a subject vehicle by the autonomous travel control; and setting a wider interval from a first point at which a first automatic lane change is made to a second point at which a second automatic lane change is made than the interval taken when the plurality of times of the automatic lane change by the driving assist control are planned when planning a plurality of times of the automatic lane change.

According to these aspects, in cases where a driver is not obligated to monitor the surroundings, a wider interval is ensured between a first point where a first automatic lane change is performed and a second point where a second automatic lane change is performed as compared with cases where a driver is obligated to monitor the surroundings. When a plurality of times of planned automatic lane change are performed at intervals, such an occupant as a driver is less prone to recognize that an automatic lane change is continuously repeated; therefore, the occupant can determine that the automatic lane change has been made under normal control. According to the foregoing, an occupant's anxiety can be suppressed even when a plurality of times of automatic lane change are made.

Hereinafter, a plurality of embodiments will be described with reference to the drawings. In the following description, the same reference symbols are assigned to corresponding components in each embodiment in order to avoid repetitive descriptions. In each of the embodiments, when only a part of the configuration is described, the remaining parts of the configuration may adopt corresponding parts of other embodiments. Further, not only the combinations of the configurations explicitly shown in the description of the respective embodiments, but also the configurations of the multiple embodiments can be partially combined even if they are not explicitly shown if there is no problem in the combinations in particular.

First Embodiment

Figure 2:
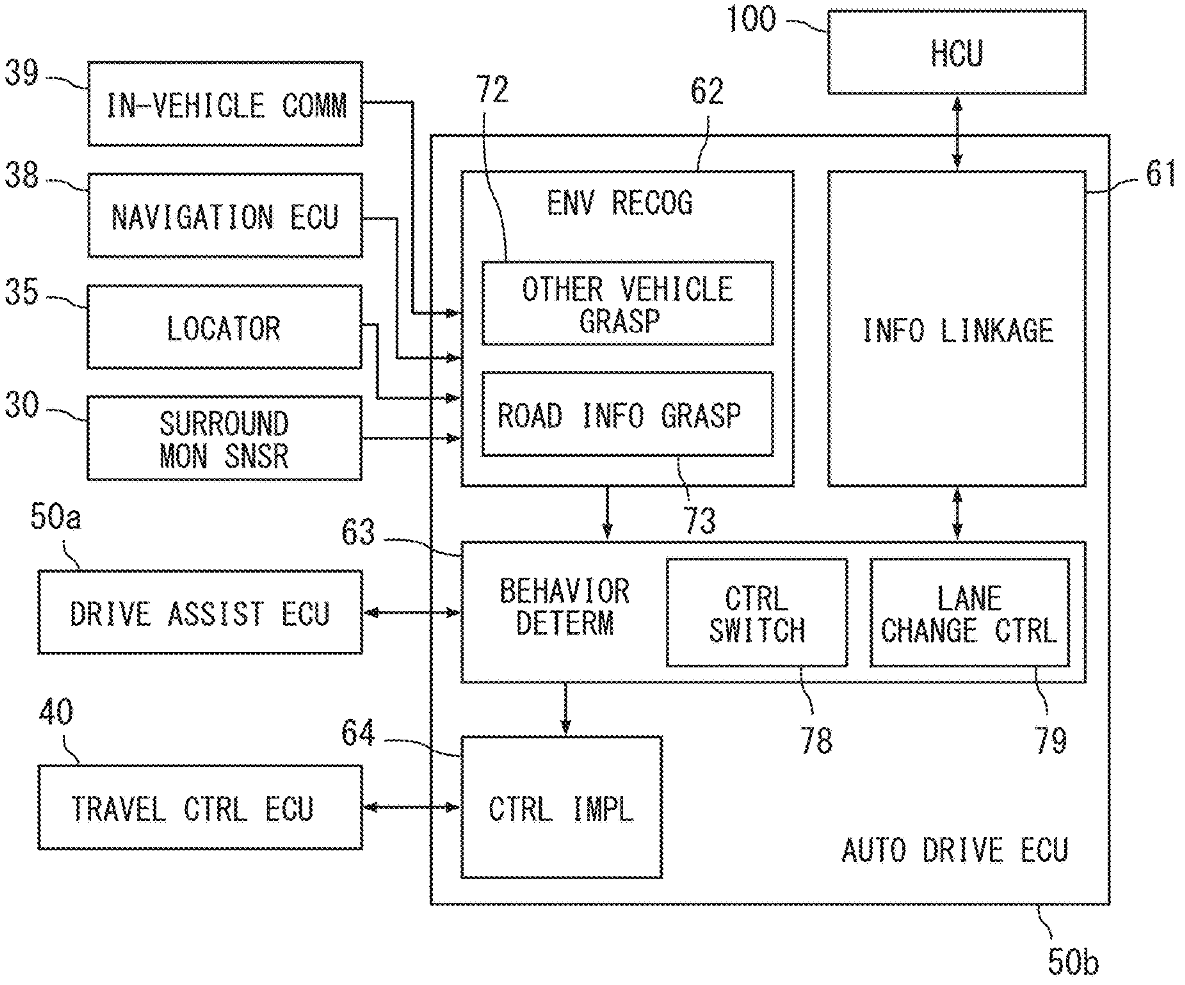
FIG. 2 is a block diagram showing the details of an automatic driving ECU.
Figure 3:
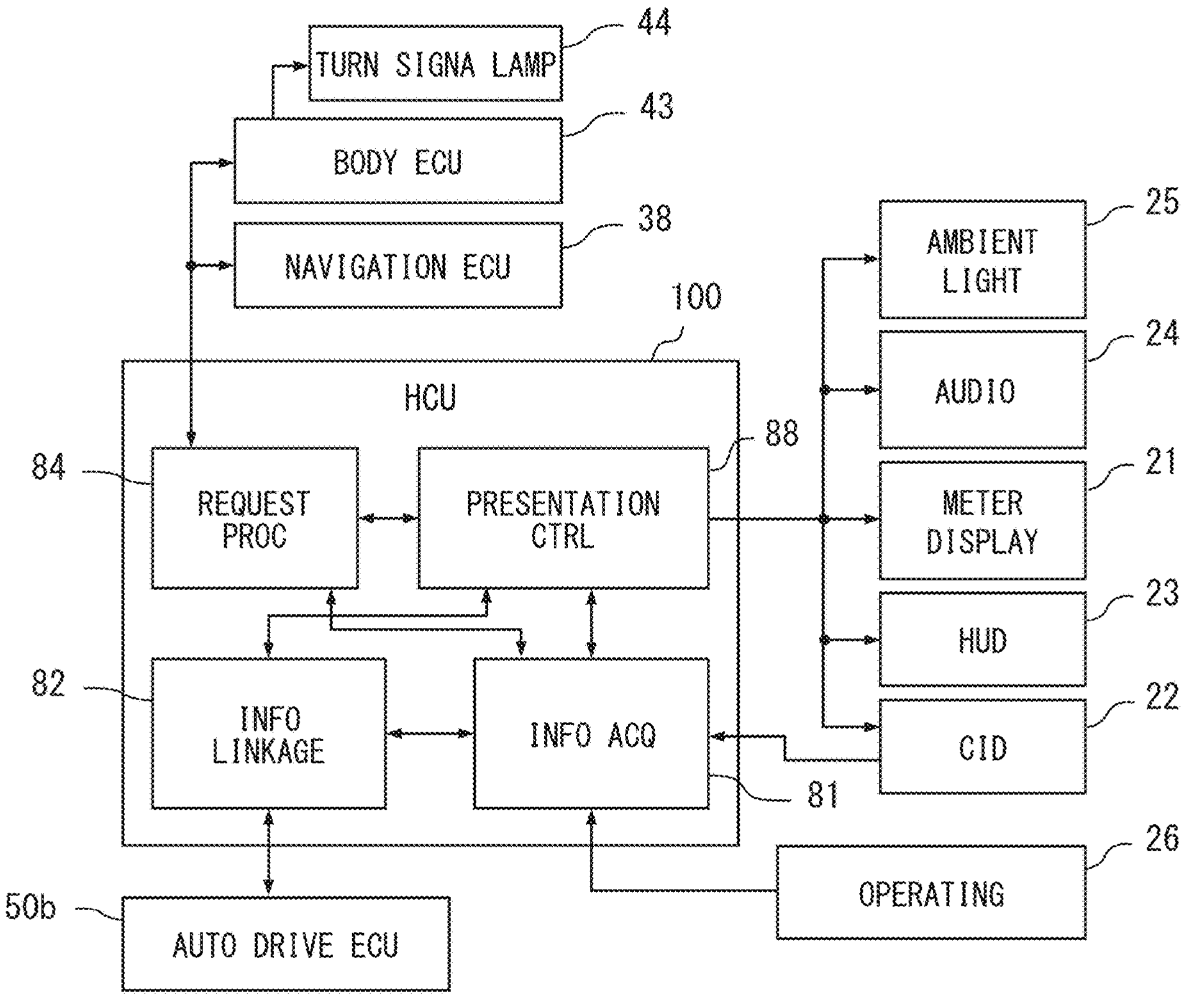
FIG. 3 is a block diagram showing the details of a HCU.

A HCU (Human Machine Interface Control Unit) 100 according to the first embodiment of the present disclosure, shown in FIG. 1 to FIG. 3, is an interface control device used in a vehicle (hereafter, referred to as subject vehicle Am). The HCU 100 constitutes a HMI (Human Machine Interface) system 10 of the subject vehicle Am together with a plurality of input/output devices and the like. The HMI system 10 has: an input interface function of accepting operation by such an occupant as a driver of the subject vehicle Am; and an output interface function of presenting information toward a driver and the like.

The HCU 100 is communicatively connected to a communication bus 99 of an in-vehicle network 1 equipped in the subject vehicle Am. The HCU 100 is one of a plurality of nodes provided in the in-vehicle network 1. The communication bus 99 of the in-vehicle network 1 is connected with a surroundings monitoring sensor 30, a locator 35, a navigation ECU (Electronic Control Unit) 38, an in-vehicle communicator 39, a travel control ECU 40, a body ECU 43, and the like. In addition, the communication bus 99 of the in-vehicle network 1 is connected with a driving assist ECU 50*a*, an automatic driving ECU 50*b*, and the like. These nodes connected to the communication bus 99 are capable of communicating with one another. Of these devices and ECUs, specific nodes may be electrically connected directly with each other and be capable of communicating without the intervention of the communication bus 99.

The surroundings monitoring sensor 30 is an autonomous sensor that monitors the surrounding environment of the subject vehicle Am. The surroundings monitoring sensor 30 includes one or more of, for example, a camera unit 31, a millimeter wave radar 32, LIDAR 33, and a sonar 34. The surroundings monitoring sensor 30 is capable of detecting a moving object and a stationary object within a detection range around the subject vehicle. The surroundings monitoring sensor 30 provides detection information of an object around the subject vehicle to the driving assist ECU 50*a*, the automatic driving ECU 50*b*, and the like.

The locator 35 is so configured as to include a GNSS (Global Navigation Satellite System) receiver, an inertia sensor, and the like. The locator 35 successively determines a subject vehicle position, a traveling direction, and the like of the subject vehicle Am by combining positioning signals received from a plurality of positioning satellites by the GNSS receiver, a measurement result of the inertia sensor, vehicle speed information outputted to the communication bus 99, and the like. The locator 35 successively outputs positional information and azimuth information of the subject vehicle Am based on a positioning result to the communication bus 99 as locator information.

The locator 35 further includes a map database (hereafter, referred to as map DB) 36 containing map data. The map DB 36 is configured based on a mass storage medium holding a large number of pieces of three-dimensional map data and two-dimensional map data. The three-dimensional map data is a so-called HD (High Definition) map and includes road information required for automatic driving. Specifically, three-dimensional shape information of roads, detailed information of each lane, and the like are included in the three-dimensional map data. The locator 35 is capable of updating the three-dimensional map data and the two-dimensional map data to up-to-date information through vehicle exterior communication by the in-vehicle communicator 39. The locator 35 reads map data of the vicinity of the present position from the map DB 36 and provides the map data to the driving assist ECU 50*a*, the automatic driving ECU 50*b*, and the like together with locator information.

The navigation ECU 38 acquires information of a destination specified by such an occupant as a driver based on operating information acquired from the HCU 100. The navigation ECU 38 acquires subject vehicle position information and azimuth information from the locator 35 and sets a route from the present position to a destination. The navigation ECU 38 provides route information indicating a set route to a destination to the driving assist ECU 50*a*, the automatic driving ECU 50*b*, the HCU 100, and the like. In cooperation with the HMI system 10, as route guidance to a destination, the navigation ECU 38 combines screen display, a voice message, and the like and notifies a driver of a traveling direction of the subject vehicle Am at an intersection, a branching point, or the like.

Such a user terminal as a smartphone or the like may be connected to the in-vehicle network 1 or the HCU 100. In place of the locator 35, such a user terminal may provide subject vehicle position information, azimuth information, map data, and the like to the driving assist ECU 50*a*, the automatic driving ECU 50*b*, or the like. In place of the navigation ECU 38, a user terminal may provide route information to a destination to the driving assist ECU 50*a*, the automatic driving ECU 50*b*, the HCU 100, or the like.

The in-vehicle communicator 39 is a vehicle exterior communication unit equipped in the subject vehicle Am and functions as a V2X (Vehicle to Everything) communicator. The in-vehicle communicator 39 sends and receives information to and from a roadside machine installed on a roadside by wireless communication. For example, the in-vehicle communicator 39 receives traffic jam information and road construction information of the vicinity of the present position and in the traveling direction of the subject vehicle Am from a roadside machine. Traffic jam information and road construction information are VICS (registered trademark) information or the like. The in-vehicle communicator 39 provides received traffic jam information and road construction information to the automatic driving ECU 50*b*, the HCU 100, and the like.

The travel control ECU 40 is an electronic control device including mainly a microcontroller. The travel control ECU 40 has at least the functions of a brake control ECU, a drive control ECU, and a steering control ECU. The travel control ECU 40 continuously exercises brake force control of each wheel, output control of an on-board power source, and steering angle control based on any one of an operation command based on a driver's driving operation, a control command of the driving assist ECU 50*a*, and a control command of the automatic driving ECU 50*b*.

The body ECU 43 is an electronic control device including mainly a microcontroller. The body ECU 43 has at least the functions of controlling operation of a lighting device (for example, a turn signal lamp 44 and the like) equipped in the subject vehicle Am. The body ECU 43 starts flashing of either of a left and a right turn signal lamp 44 corresponding to an operating direction based on detection of user operation input to a turn signal switch (winker lever) provided in a steering column portion or the like.

The driving assist ECU 50*a* and the automatic driving ECU 50*b* constitute an automatic driving system 50 of the subject vehicle Am. Owing to the provision of the automatic driving system 50, the subject vehicle Am becomes an automatic driving vehicle having an automatic driving function and is capable of traveling by the automatic driving function.

In the automatic driving system 50, the driving assist ECU 50*a* implements a driving assist function that assists a driver's driving operation. In terms of the automatic driving levels specified by the Society of Automotive Engineers, the driving assist ECU 50*a* enables high-grade driving assist or partial automatic driving at Level 2 or so. Automatic driving performed by the driving assist ECU 50*a* is surroundings monitoring obligated automatic driving during which a driver is required to visually monitor the surroundings of the subject vehicle.

The automatic driving ECU 50*b* can substitute for a driver's driving operation and is capable of performing autonomous traveling at Level 3 or higher in which a system becomes a control main body in terms of the automatic driving levels specified by the Society of Automotive Engineers. Automatic driving performed by the automatic driving ECU 50*b* is eyes-off automatic driving during which monitoring of the surroundings of the subject vehicle is unnecessary, that is, a driver is not obligated to monitor the surroundings.

In the above-mentioned automatic driving system 50, a travel control state of the automatic driving function can be switched among a plurality of types of automatic driving control, including at least automatic driving control by the driving assist ECU 50*a* in which surroundings monitoring is obligated and automatic driving control by the automatic driving ECU 50*b* in which surroundings monitoring is not obligated. In the following description, automatic driving control at Level 2 or lower by the driving assist ECU 50*a* will be referred to as "driving assist control," and automatic driving control at Level 3 or higher by the automatic driving ECU 50*b* will be referred to as "autonomous travel control." The automatic driving ECU 50*b* may be capable of performing automatic driving at Level 4 or higher.

During an automatic driving period during which the subject vehicle Am travels by autonomous travel control, a driver is permitted to make a predetermined specific action (hereafter, referred to as second task) other than driving. A second task is legally permitted for a driver until a request to perform driving operation performed by the automatic driving ECU 50*b* and the HCU 100 in cooperation with each other, that is, a driving change request takes place. Assumed second tasks include, for example, such actions as viewing of entertainment contents, such as video contents, operation of such a device as a smartphone, taking a meal, and the like.

The driving assist ECU 50*a* is a computer including mainly a control circuit having a processing unit, RAM, a storage unit, an input/output interface, a bus connecting these items, and the like. The driving assist ECU 50*a* implements a driving assist function, such as ACC (Adaptive Cruise Control), LTC (Lane Trace Control), LCA (Lane Change Assist), and the like, by execution of a program at the processing unit. The driving assist ECU 50*a* provides control status information indicating a status of driving assist control to the automatic driving ECU 50*b*.

The automatic driving ECU 50*b* has higher computing power than the driving assist ECU 50*a* and is capable of at least exercising travel control equivalent to ACC and LTC. The automatic driving ECU 50*b* may be capable of exercising driving assist control in which a driver is obligated to monitor the surroundings in place of the driving assist ECU 50*a* in a scene where autonomous travel control is tentatively interrupted or other like scenes. The automatic driving ECU 50*b* is a computer including mainly a control circuit having a processing unit 51, RAM 52, a storage unit 53, an input/output interface 54, a bus connecting these items, and the like. The processing unit 51 performs varied processing to implement the automatic driving control method according to the present disclosure by accessing the RAM 52. The storage unit 53 holds various programs, (automatic driving control program, and the like) executed by the processing unit 51. By execution of a program by the processing unit 51, in the automatic driving ECU 50*b*, an information linkage unit 61, an environment recognition unit 62, a behavior determination unit 63, a control implementation unit 64, and the like are built as a plurality of functional units for implementing an automatic driving function (Refer to FIG. 2).

Figure 4:
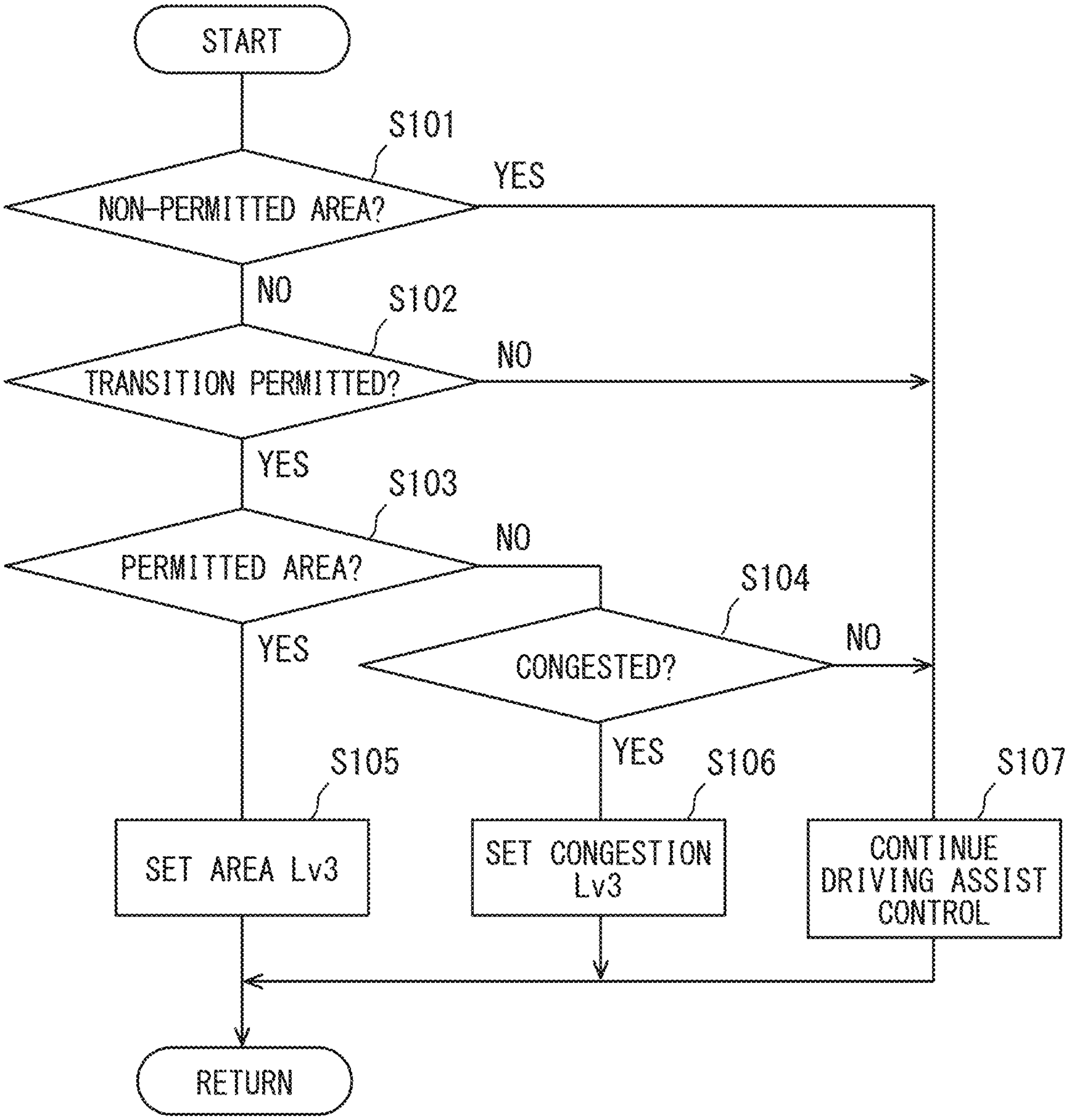
FIG. 4 is a flowchart illustrating the details of control switching processing performed at an automatic driving ECU.
Figure 5:
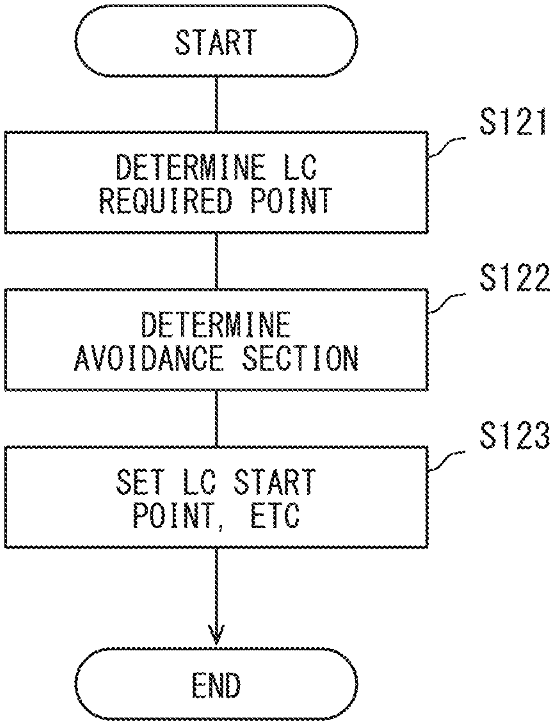
FIG. 5 is a flowchart illustrating the details of lane change planning processing performed at an automatic driving ECU.
Figure 6:
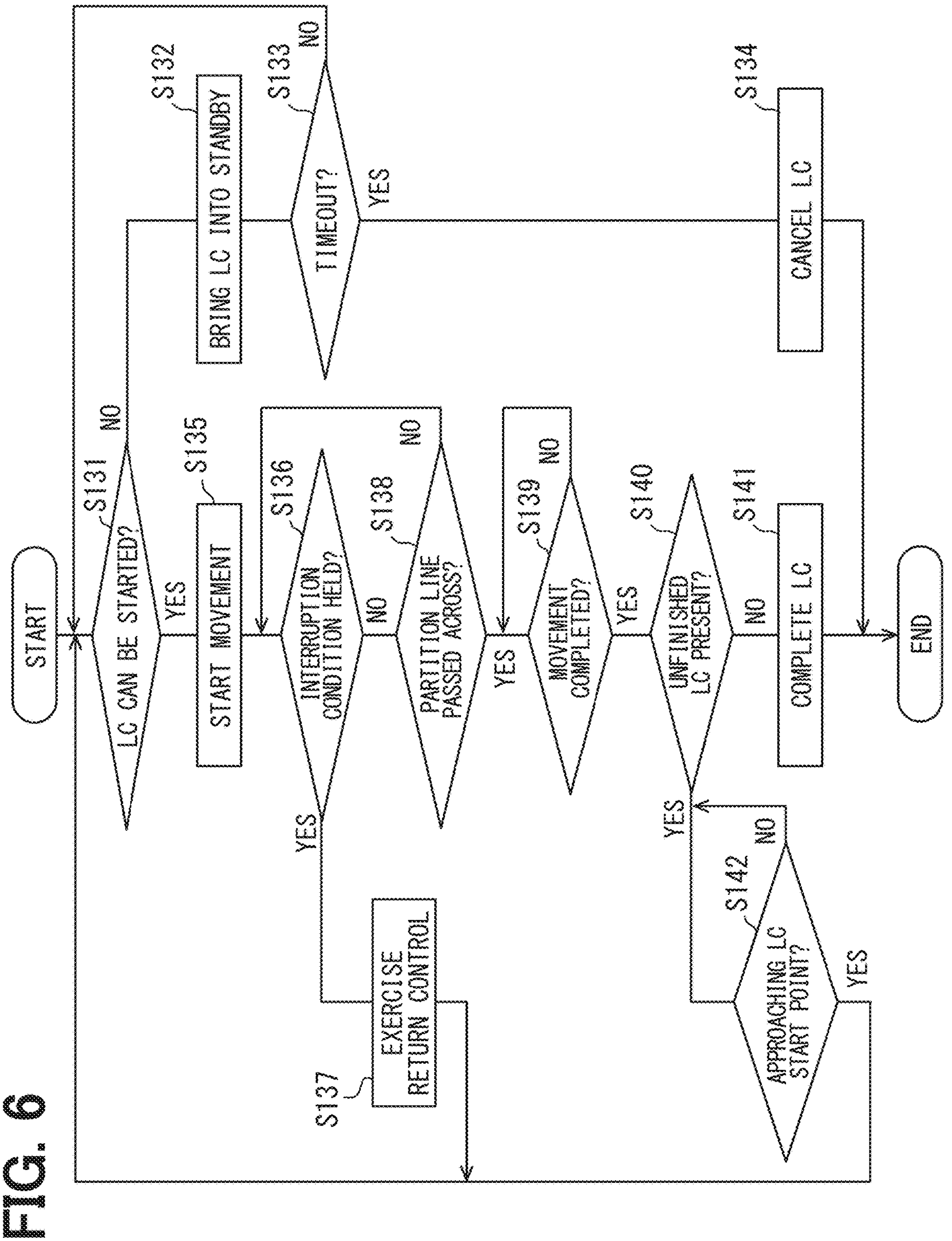
FIG. 6 is a flowchart illustrating the details of lane change execution processing performed at an automatic driving ECU.

The information linkage unit 61 performs information provision to an information linkage unit 82, described later, of the HCU 100 and information acquisition from the information linkage unit 82. Owing to cooperation between these information linkage units 61, 82, the automatic driving ECU 50*b* and the HCU 100 share respectively acquired information therebetween. The information linkage unit 61 generates control status information indicating an operating status of an automatic driving function and provides the generated control status information to the information linkage unit 82. The control status information includes a determination result of determination made by control switching processing (Refer to FIG. 4), lane change planning processing (Refer to FIG. 5), and lane change execution processing (Refer to FIG. 6) described later. The information linkage unit 61 enables notification by the HCU 100 synchronized with the operating status of an automatic driving function by outputting control status information to the information linkage unit 82. In addition, the information linkage unit 61 acquires driver's operation information and the like from the information linkage unit 82 to grasp the details of user operation input to the HMI system 10 or the like.

The environment recognition unit 62 combines locator information and map data acquired from the locator 35 and detection information acquired from the surroundings monitoring sensor 30 to recognize a travel environment of the subject vehicle Am. The environment recognition unit 62 grasps any traffic jam in the vicinity of the subject vehicle based on detection information from the surroundings monitoring sensor 30, vehicle speed information of the subject vehicle Am grasped at the travel control ECU 40, and the like. When the present vehicle speed of the subject vehicle Am is equal to or lower than a traffic jam speed (for example, 10 km/h or so) and a vehicle ahead running along the subject vehicle lane is present, the environment recognition unit 62 determines that the vicinity of the subject vehicle is in a traffic jam state. Further, when a vehicle speed of the subject vehicle Am or the vehicle ahead exceeds a traffic jam clear-up speed (for example, 60 km/h or so) after the vicinity of the subject vehicle was determined to be in a traffic jam state, the environment recognition unit 62 determines that the traffic jam has cleared up. The environment recognition unit 62 may use traffic jam information received by the in-vehicle communicator 39 to make a determination related to traffic jam.

The environment recognition unit 62 includes another vehicle grasping unit 72 and a road information grasping unit 73 as sub-functional units for travel environment recognition. The other vehicle grasping unit 72 grasps a relative position, a relative speed, and the like of a dynamic object in the vicinity of the subject vehicle, including another vehicle running in the vicinity of the subject vehicle Am and the like. The other vehicle grasping unit 72 at least grasps a vehicle ahead and a vehicle behind running along the same lane (hereafter, referred to as subject vehicle lane) as the subject vehicle Am and a lateral vehicle running along an adjacent lane adjoining to the subject vehicle lane. When the subject vehicle Am travels on a road having three or more lanes, the other vehicle grasping unit 72 grasps a lateral vehicle running along a detached lane positioned on the opposite side to the subject vehicle lane with an adjacent lane in between. Another vehicle grasping unit 72 corresponds to a different vehicle grasping unit.

The road information grasping unit 73 grasps information related to a road on which the subject vehicle Am travels. When route information has been acquired from the navigation ECU 38, the road information grasping unit 73 extracts a specific point in a road on which the subject vehicle Am is to travel, specifically, a branching point (a junction or the like), a merging point, an exit point, and the like of a highway. Further, with respect to a road on which the subject vehicle Am is to travel, the road information grasping unit 73 grasps a traffic jam section where a traffic jam is present, a regulated section where a regulation is applied because of a road construction or the like, and the like.

The road information grasping unit 73 grasps whether a road on which the subject vehicle Am is traveling or to travel is within a preset permitted area or limited permitted area. Information indicating whether an area is a permitted area or a limited permitted area may be recorded in a map data stored in the map DB 36 or may be included in reception information received by the in-vehicle communicator 39. A permitted area and a limited permitted area can be equivalent to an operational design domain where automatic driving during which a driver is not obligated to monitor the surroundings is legally permitted. In detail, the automatic driving free from a surroundings monitoring obligation includes, as a plurality of control modes, congestion limited control (hereafter, referred to as congestion Level 3) exercised only for traveling in a traffic jam and area limited control (hereafter, referred to as area Level 3) exercised only within a specific permitted area. On a road within a permitted area, both congestion Level 3 and area Level 3 are permitted to be exercised and on a road within a limited area, only congestion Level 3 is permitted to be exercised. On a road (hereafter, referred to as non-permitted area) that is included in neither a permitted area nor a limited permitted area, traveling by automatic driving free from a surroundings monitoring obligation is prohibited. A permitted area and a limited permitted area are set in, for example, a highway, a superhighway, or the like.

The behavior determination unit 63 controls driving change between the automatic driving system 50 and a driver in cooperation with the driving assist ECU 50*a* and the HCU 100. When the automatic driving ECU 50*b* has control of driving operation, the behavior determination unit 63 generates a planned traveling line through which the subject vehicle Am is caused to travel based on a result of recognition of a travel environment by the environment recognition unit 62 and outputs the generated planned traveling line to the control implementation unit 64.

When the automatic driving ECU 50*b* has control of driving operation, the control implementation unit 64 exercises acceleration and deceleration control (in other words, speed control), steering control, and the like of the subject vehicle Am in accordance with the planned traveling line generated at the behavior determination unit 63 in cooperation with the travel control ECU 40. Specifically, the control implementation unit 64 generates a control command based on the planned traveling line and successively outputs the generated control command to the travel control ECU 40.

A description will be given to the details of a plurality of display devices included in the HMI system 10, an audio device 24, an ambient light 25, an operating device 26, and the HCU 100.

The display devices present information through a driver's vision by image display or the like. The display devices include a meter display 21, a center information display (hereafter, referred to as CID) 22, a head-up display (hereafter, referred to as HUD) 23, and the like. The CID 22 has the functions of a touch panel and detects a touch operation with a display screen by a driver or the like.

The audio device 24 has a plurality of speakers disposed in the vehicle compartment, so arranged as to encircle the driver's seat and reproduces a notification sound, a voice message, and the like in the vehicle compartment by the speakers. The ambient light 25 is provided in an instrument panel, a steering wheel, and the like. The ambient light 25 makes an information presentation utilizing a driver's peripheral vision by ambient display with a luminescent color varied.

The operating device 26 is an input unit that accepts user operation by a driver or the like. The operating device 26 is output, for example, user operation related to activation and stopping of an automatic driving function, user operation related to setting of a destination in route guidance, and the like. The operating device 26 includes a steer switch provided in a spoke portion of a steering wheel, an operating lever provided in a steering column portion, a voice input device that recognizes the contents of a driver's utterance, and the like.

The HCU 100 is an information presentation device that integrally controls information presentation using a plurality of the display devices, the audio device 24, and the ambient light 25. The HCU 100 controls presentation of information related to automatic driving in cooperation with the automatic driving system 50. The HCU 100 is a computer including mainly a control circuit having a processing unit 11, RAM 12, a storage unit 13, an input/output interface 14, a bus connecting these items, and the like. The processing unit 11 performs varied processing (presentation control processing) for implementing the presentation control method according to the present disclosure by accessing the RAM 12. The RAM 12 may be so configured as to include a video RAM for video data generation. The storage unit 13 may be so configured as to include a nonvolatile storage medium. The storage unit 13 holds various programs (presentation control program and the like) executed by the processing unit 11. The HCU 100 builds a plurality of functional units by executing a program stored in the storage unit 13 by the processing unit 11. In the HCU 100, such functional units as an information acquisition unit 81, the information linkage unit 82, a request processing unit 84, a presentation control unit 88, and the like are built (Refer to FIG. 3).

The information acquisition unit 81 acquires operating information indicating the contents of user operation from the CID 22, the operating device 26, and the like. The information acquisition unit 81 provides operating information of user operation related to an automatic driving function to the automatic driving ECU 50*b* through the information linkage unit 82. The information acquisition unit 81 provides operating information of user operation to set a destination of the subject vehicle Am to the navigation ECU 38 through the request processing unit 84.

The information linkage unit 82 cooperates with the automatic driving ECU 50*b* to enable information to be shared between the automatic driving system 50 and the HCU 100. The information linkage unit 82 provides operating information grasped at the information acquisition unit 81 to the automatic driving ECU 50*b*. The information linkage unit 82 acquires control status information indicating a status of an automatic driving function from the automatic driving ECU 50*b*. The information linkage unit 82 grasps an operating status of automatic driving by the automatic driving system 50 based on control status information. Specifically, the information linkage unit 82 grasps whether travel control under way is driving assist control or autonomous travel control, that is, whether autonomous travel control in which a driver is not obligated to monitor the surroundings is being exercised by an automatic driving function. When the subject vehicle Am is traveling with a driver not obligated to monitor the surroundings, the information linkage unit 82 further grasps a control mode of autonomous travel control.

The request processing unit 84 enables cooperation between the HCU 100 and each in-vehicle device through communication with the in-vehicle devices connected to the communication bus 99. Specifically, the request processing unit 84 acquires information of a route to a destination, a guidance image based on map data, a request to provide guidance, and the like from the navigation ECU 38 and provides the information to the presentation control unit 88 to thereby enable route guidance by the HMI system 10. In addition, the request processing unit 84 enables the turn signal lamp 44 linked with display related to automatic driving to switch between on and off by outputting an actuation request to the body ECU 43.

The presentation control unit 88 integrally provides information to a driver using each display device, the audio device 24, the ambient light 25, or the like. The presentation control unit 88 processes control status information acquired at the information linkage unit 82 as a request to make presentation of information related to an automatic driving function and presents contents and information in accordance with an operating status of automatic driving. When exercise of eyes-off autonomous travel control is grasped at the information linkage unit 82, the presentation control unit 88 enables video contents or the like to be reproduced. When grasping a termination schedule of autonomous travel control, the presentation control unit 88 makes a demand for driving change or the like toward a driver.

A further description will be given to the details of automatic driving control by the automatic driving ECU 50*b* and information presentation control by the HCU 100.

In the automatic driving ECU 50*b*, the behavior determination unit 63 includes a control switching unit 78 and a lane change control unit 79 as sub-functional units for controlling an operating status of an automatic driving function (Refer to FIG. 2).

The control switching unit 78 switches between driving assist control in which a driver is obligated to monitor the surroundings and autonomous travel control in which a driver is not obligated to monitor the surroundings. Further, when the subject vehicle Am travels by autonomous travel control, the control switching unit 78 switches a travel control state (control mode) among a plurality of travel control states including area Level 3 and congestion Level 3. The control switching unit 78 starts control switching processing (Refer to FIG. 4) based on, for example, start of driving assist control by the driving assist ECU 50*a* and switches a travel control state among a plurality of travel control states in cooperation with the driving assist ECU 50*a*.

In the control switching processing, the control switching unit 78 determines whether the subject vehicle Am is traveling on a road on which exercise of autonomous travel control is permitted (S101). When it is grasped at the road information grasping unit 73 that the subject vehicle Am is traveling in a non-permitted area (S101: YES), the control switching unit 78 does not permit exercise of autonomous travel control and causes driving assist control by the driving assist ECU 50*a* to be continued (S107). When a travel control state is caused to make a transition from autonomous travel control to driving assist control by the control switching unit 78, the automatic driving ECU 50*b* may exercise driving assist control.

Meanwhile, when the subject vehicle Am is traveling in a permitted area or a limited permitted area (S101: NO), the control switching unit 78 determines operation of a transition to Level 3 has been permitted by a driver (S102). When a transition has been permitted by specific user operation (Level 3 transition operation) or the like (S102: YES), the control switching unit 78 enables autonomous travel control to be exercised. Determination of whether a transition has been permitted based on user operation may be omitted.

The control switching unit 78 determines whether the subject vehicle Am is traveling in a permitted area (S103). When the subject vehicle Am is traveling in a permitted area (S103: YES), the control switching unit 78 sets autonomous travel control at area Level 3 as a travel control state of the subject vehicle Am (S105). Meanwhile, when the subject vehicle Am is traveling in a limited permitted area (S103: NO), the control switching unit 78 determines whether the vicinity of the subject vehicle is congested (S104). When congestion of the vicinity of the subject vehicle is grasped by the environment recognition unit 62 (S104: YES), the control switching unit 78 sets autonomous travel control at congestion Level 3 as a travel control state of the subject vehicle Am (S106). Meanwhile, when the vicinity of the subject vehicle is not congested (S104: NO), the control switching unit 78 does not permit a transition to autonomous travel control and causes driving assist control to be continued (S107).

The lane change control unit 79 plans to make an automatic lane change of the subject vehicle Am by autonomous travel control. The lane change control unit 79 cooperates with the control implementation unit 64 and enables an automatic lane change of the subject vehicle Am with a hands-off and eyes-off state maintained. The lane change control unit 79 starts lane change planning processing (Refer to FIG. 5) based on switching to autonomous travel control by the control switching unit 78.

Figure 7:
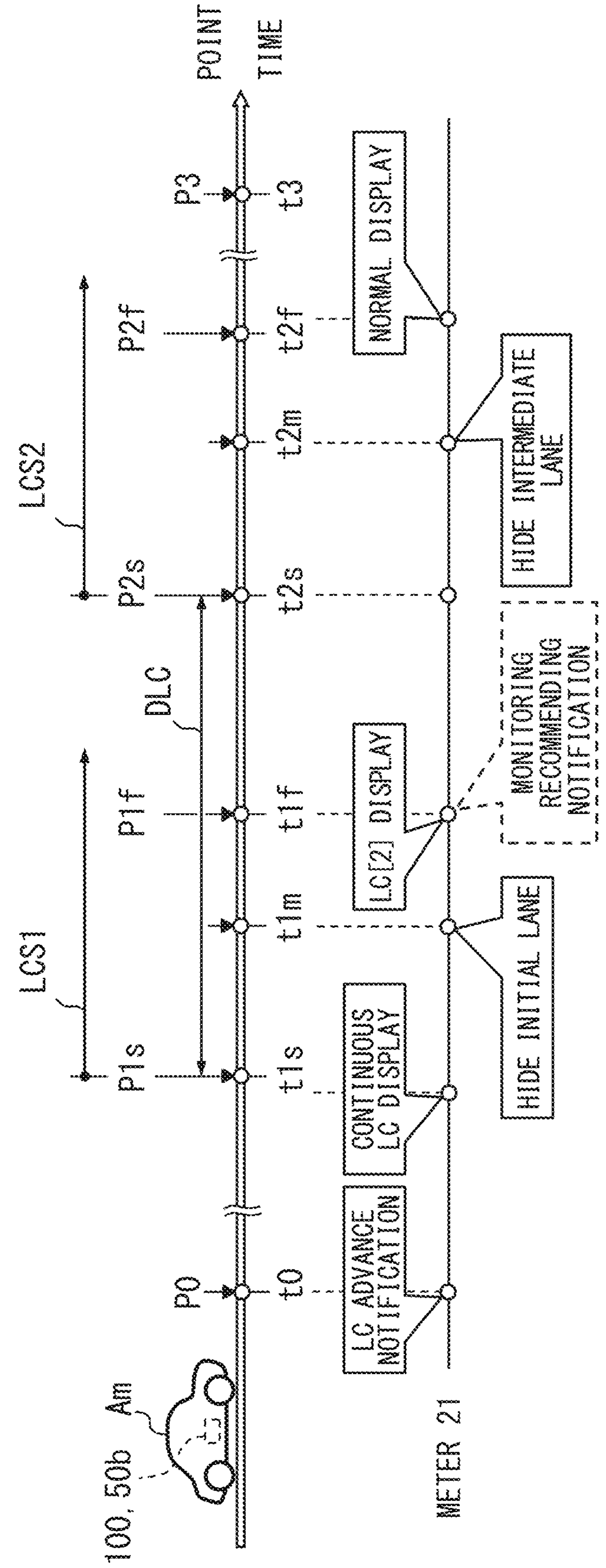
FIG. 7 is a timing chart for explaining transition of subject vehicle status display in continuous LC.

In the lane change planning processing, the lane change control unit 79 determines a point (hereafter, referred to as LC required point P3, Refer to FIG. 7) where the subject vehicle Am requires a lane change on a road on which the subject vehicle Am is to travel from among specific points extracted at the road information grasping unit 73 (S121).

Examples of LC required point P3 are a branching point, an exit point, and the like of a highway. The lane change control unit 79 further determines a section (hereafter, referred to as avoidance section) where it is desired to avoid execution of an automatic lane change on a road in a set route on which the subject vehicle Am is to travel (S122). The lane change control unit 79 determines, as avoidance sections, a section (merging section) on the near side of a merging point extracted at the road information grasping unit 73, a traffic jam section and a regulated section grasped at the road information grasping unit 73, and the like. A section where a spacing between vehicles is narrowed and a lane change of the subject vehicle Am is prone to be hindered by other vehicles is set as an avoidance section.

The lane change control unit 79 sets a point (hereafter, referred to as LC start point) where an automatic lane change is made (started) and a planned execution section so that the automatic lane change will be completed on the near side of an LC required point P3 within a range excluding an avoidance section (S123). In detail, in the lane change control unit 79, a distance or a time required for a first automatic lane change is specified in advance. The lane change control unit 79 determines an LC start point so that an end point of a planned execution section does not fall within an avoidance section, in other words, so that the whole of a planned execution section is out of an avoidance section. The lane change control unit 79 may determine an LC start point relative to an LC arrival time t3 when arrival at the LC required point P3 will be made.

When a plurality of times of lane change are required at an LC required point P3, the lane change control unit 79 sets a plurality of LC start points. For example, when two times of lane change are required, the lane change control unit 79 sets a first start point P1*s* to make the first automatic lane change and a second start point P2*s* to make the second automatic lane change (Refer to FIG. 7). In addition to the first start point P1*s* and the second start point P2*s*, the lane change control unit 79 sets a first section LCS1 and a second section LCS2 as planned execution sections starting at these start points. When it is estimated that the first automatic lane change will not be completed within the first section LCS1 and when it is estimated that the second automatic lane change will not be completed within the second section LCS2, the lane change control unit 79 cancels execution of a series of the automatic lane changes.

The lane change control unit 79 sets a predetermined execution interval DLC between the first start point P1*s* and the second start point P2*s*. An execution interval DLC may be set between an end point of the first section LCS1 and a start point of the second section LCS2. The lane change control unit 79 may set an execution interval DLC relative to distance or may set an execution interval DLC relative to time. In the following description, a scene in which a plurality of planned execution sections are set within a predetermined section or within a predetermined time by setting an execution interval DLC as mentioned above and a plurality of times of automatic lane change are planned within the predetermined section or within the predetermined time will be referred to as "continuous LC." For example, when an execution interval DLC is set to 1 kilometer or so, a predetermined section is set to, for example, several kilometers or so. When an execution interval DLC is set to 1 minute or so, a predetermined time is set to, for example, several minutes or so.

In addition to an automatic lane change corresponding to an LC required point P3, the lane change control unit 79 plans an automatic lane change to overtake another vehicle ahead of the subject vehicle. When a cruising speed of a vehicle ahead to follow is lower than a target speed for autonomous travel control by a predetermined speed or more, the lane change control unit 79 plans an automatic lane change to move to an adjacent lane to overtake the vehicle ahead. Further, when in addition to a vehicle ahead, a cruising speed of a front lateral vehicle running along an adjacent lane is lower than the target speed by a predetermined speed or more, the lane change control unit 79 plans a second automatic lane change to move to a detached lane to overtake the vehicle ahead and the front lateral vehicle. After the subject vehicle Am overtakes the vehicle ahead and the front lateral vehicle, the lane change control unit 79 further plans an automatic lane change to return to the lane along which the subject vehicle was initially traveling.

Based on approach to an LC start point (Refer to first start point P1*s* in FIG. 7) set by the lane change planning processing or generation of a lane change plan for overtaking, the lane change control unit 79 starts lane change execution processing (Refer to FIG. 6) in cooperation with the control implementation unit 64. In the lane change execution processing, the lane change control unit 79 determines whether an automatic lane change from the subject vehicle lane to an adjacent lane can be started (S131). When a lateral vehicle is present in an adjacent lane as a destination of movement and an automatic lane change cannot be started (S131: NO), the lane change control unit 79 brings the automatic lane change into a standby state (S132). When a predetermined time passes and the automatic lane change is brought into a timeout (S133: YES), the lane change control unit 79 cancels execution of the automatic lane change (S134).

Meanwhile, when a lateral vehicle is not present in the adjacent lane as a destination of movement and an automatic lane change can be started (S131: YES), the control implementation unit 64 starts movement of the subject vehicle Am toward the adjacent lane by steering control (S135). After start of the lateral movement by the control implementation unit 64, the lane change control unit 79 determines whether an interruption condition for lane change has held (S136). For example, when another vehicle running along an adjacent lane rapidly approaches behind the subject vehicle Am, the lane change control unit 79 causes an interruption condition to hold (S136: YES). In this case, the control implementation unit 64 interrupts lateral movement under way and exercises steering control (hereafter, referred to as return control) to return to the center of the initial subject vehicle lane (S137). The lane change control unit 79 continues the determination of whether an interruption condition has held until the subject vehicle Am goes across the partition line between the subject vehicle lane and the adjacent lane (S138: YES). For example, when the center or center of gravity of the subject vehicle Am goes across a partition line (Refer to passage time t1*m* in FIG. 7) or when the whole of the subject vehicle Am has moved to an adjacent lane, the lane change control unit 79 determines that the subject vehicle Am has gone across the partition line.

When the subject vehicle Am arrives at substantially the center of the adjacent lane, the lane change control unit 79 determines that movement to the adjacent lane has been completed (S139: YES, refer to first completion point P1*f* in FIG. 7). The lane change control unit 79 determines whether an automatic lane change that has not been made remains (S140). When a (second or later) automatic lane change that has not been made remains (S140: YES), the lane change control unit 79 determines whether the subject vehicle Am has approached the next LC start point (Refer to second start point P2*s* in FIG. 7) (S142) and waits for start of continuous automatic lane change. When the subject vehicle Am approaches the next LC start point (S142: YES), the lane change control unit 79 and the control implementation unit 64 executes S131 to S139 again to move the subject vehicle Am to the next adjacent lane (initial detached lane). When an automatic lane change that has not been made does not remain (S140: NO), the lane change control unit 79 completes a series of the present automatic lane changes (S141).

The HCU 100 uses a subject vehicle status StA (Refer to FIG. 8 to FIG. 15) to present information related to automatic lane change to a driver. The subject vehicle status StA is displayed in the meter display 21 to notify the driver of a situation of the subject vehicle Am and the vicinity of the subject vehicle. The subject vehicle status StA is bird's-eye view contents and reproduces the way of the subject vehicle Am and the vicinity thereof as viewed down from above the rear of the subject vehicle Am.

The contents of notification using a subject vehicle status StA are altered according to the reason why a lane change is made. Specifically, a subject vehicle status StA is displayed in different modes between when an automatic lane change is made in conjunction with approach to an LC required point P3 (for example, a branching point) and when an automatic lane change is made for overtaking. Hereafter, a description will be sequentially given to a display transition of a subject vehicle status StA made when continuous LC is made in conjunction with approach to an LC required point P3 and a display transition of a subject vehicle status StA made when continuous LC is made for overtaking based on FIG. 8 to FIG. 15 with reference to FIG. 3 and FIG. 7.

(Continuous LC Display in Conjunction with Approach to LC Required Point P3)

In cases where continuous LC is made in conjunction with approach to an LC required point P3, on the basis of arrival at an advance notification point P0 (Refer to FIG. 7) at a predetermined distance (for example, 1 km) to a first start point P1*s* set by the lane change planning processing, the presentation control unit 88 notifies of execution of automatic lane change. Execution advance notification (hereafter, referred to as LC advance notification) of automatic lane change is performed by display of an icon or the like, reproduction of voice or a notification sound notifying of an execution plan of automatic lane change, or the like. The presentation control unit 88 may start LC advance notification at time (hereafter, referred to as advance notification time to, refer to FIG. 7) a predetermined time before arrival at a first start point P1*s*.

Figure 8:
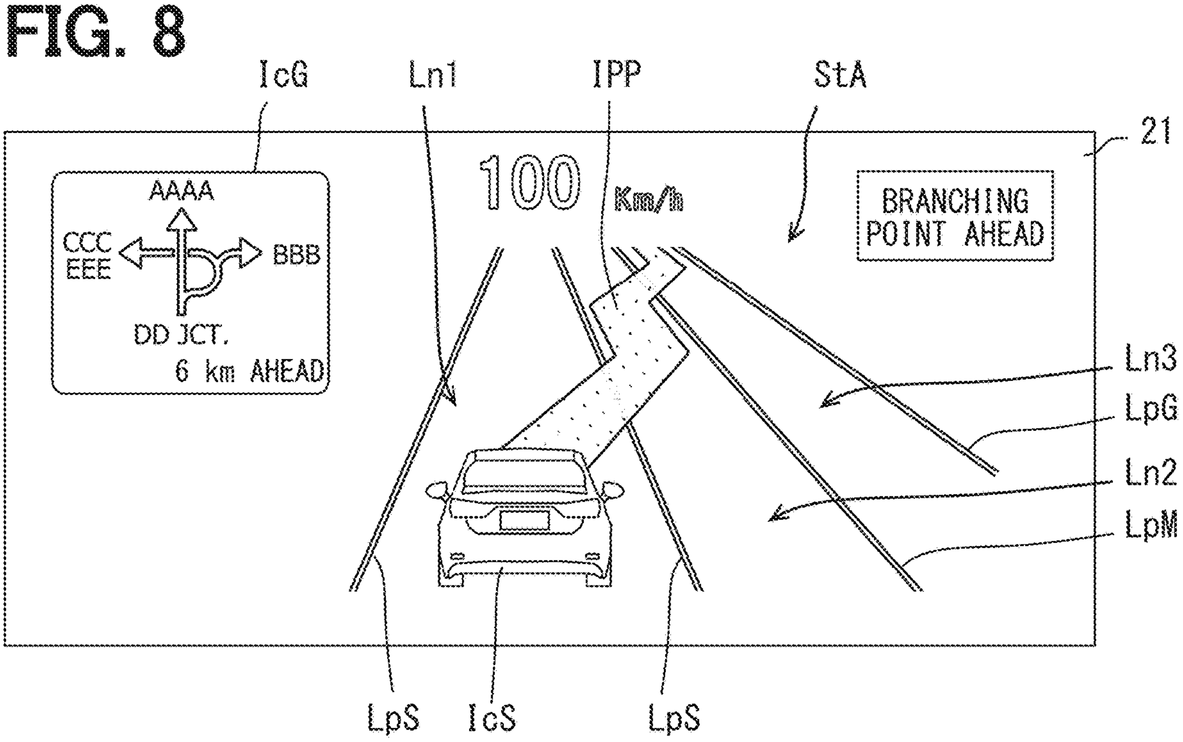
FIG. 8 is a drawing illustrating an example of a subject vehicle status in which continuous LC display is performed.

The presentation control unit 88 alters a subject vehicle status StA to a display notifying of an execution plan of continuous LC (hereafter, referred to as continuous LC display) at time (hereafter, referred to as first start time t1*s*, refer to FIG. 7) when the subject vehicle Am arrives at the first start point P1*s* or immediately before the first start time t1*s* (Refer to FIG. 8). Continuous LC display by a subject vehicle status StA includes image portions, including a subject vehicle icon IcS, an origin lane icon LpS, an adjacent lane icon LpM, a destination lane icon LpG, a planned path IPP, a guide sign icon IcG, and the like.

The subject vehicle icon IcS is an image portion symbolizing the appearance of the subject vehicle Am. The subject vehicle icon IcS is displayed substantially at the center of the subject vehicle status StA. The origin lane icon LpS is a linear image portion displayed on the left and right sides of the subject vehicle icon IcS. The origin lane icons LpS reproduce the initial lane Ln1 as the start point of an automatic lane change in the subject vehicle status StA by display in which the subject vehicle icon IcS is sandwiched therebetween.

The adjacent lane icon LpM and the destination lane icon LpG are linear image portions extended along the origin lane icons LpS. The display positions of the adjacent lane icon LpM and the destination lane icon LpG agree with a movement direction of the subject vehicle Am in automatic lane change. That is, when the subject vehicle Am makes a lane change to the right, the adjacent lane icon LpM is displayed on the right side of the origin lane icons LpS and the destination lane icon LpG is displayed on the right side of the adjacent lane icon LpM. The adjacent lane icon LpM reproduces an adjacent lane (intermediate lane Ln2) to which movement is made in a first automatic lane change in the subject vehicle status StA by the disposition thereof lined with the origin lane icons LpS. The destination lane icon LpG is displayed when a plurality of times of automatic lane change are planned. The destination lane icon LpG reproduces an arrival lane Ln3 that is a detached lane to which movement is made in a second automatic lane change and at which an arrival is made by repetition of automatic lane change in the subject vehicle status StA by the disposition thereof lined with the adjacent lane icon LpM.

The planned path IPP is displayed above the subject vehicle icon IcS and reproduces a planned traveling line of the subject vehicle Am in automatic lane change in the subject vehicle status StA by the shape thereof extended from the subject vehicle icon IcS in a belt shape. The planned path IPP is extended from the initial lane Ln1 reproduced in the subject vehicle status StA to an arrival lane Ln3. The planned path IPP is displayed in the subject vehicle status StA together with the destination lane icon LpG in accordance with start of the first automatic lane change. By display in which the planned path IPP to the arrival lane Ln3 is reproduced in the subject vehicle status StA, a driver is notified of an execution plan of a plurality of times (two times) of automatic lane change.

The guide sign icon IcG is an image portion symbolizing a guide sign provided in a highway. The guide sign is a sign that provides route guidance in proximity to a junction, and an exit guidance or the like in proximity to an exit. The guide sign icon IcG is contents that show a driver the reason why a plurality of times of automatic lane change are made and notifies the driver that an automatic lane change will be made because of approach to an LC required point PC by a display mode corresponding to a guide sign.

Figure 9:
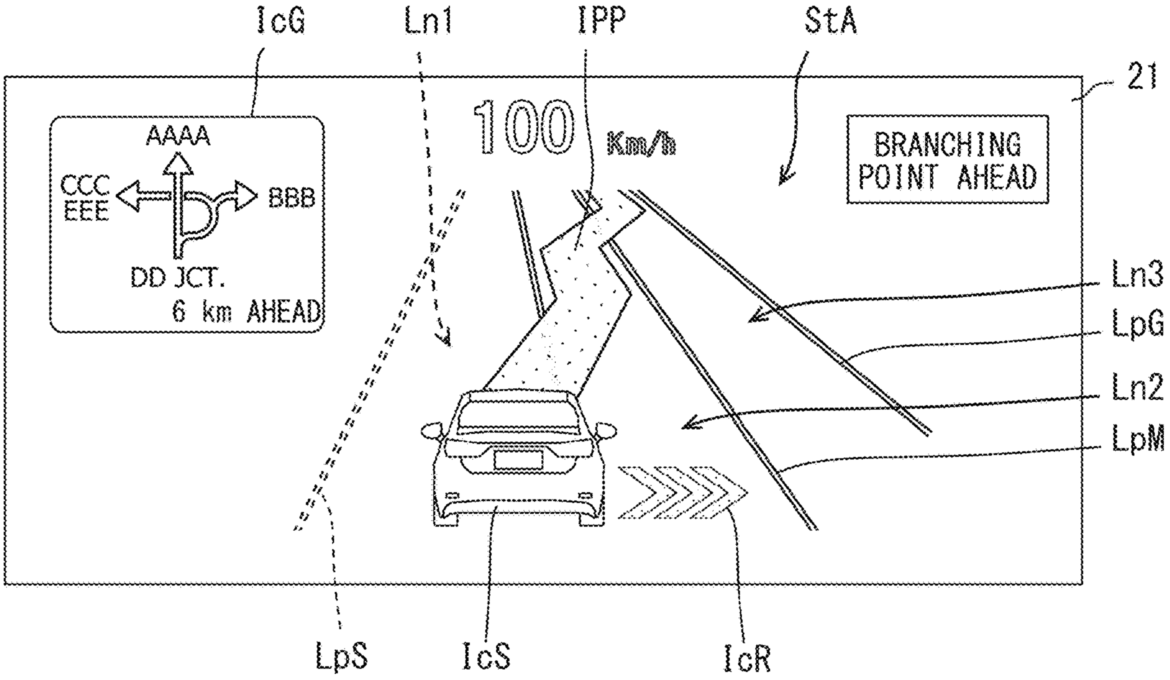
FIG. 9 is a drawing illustrating display transition of the continuous LC display shown in FIG. 8.

After passage through the first start point P1*s*, the presentation control unit 88 alters a mode of the subject vehicle status StA based on start (Refer to S135 in FIG. 6) of lateral movement of the subject vehicle Am (Refer to FIG. 9). In the subject vehicle status StA, the presentation control unit 88 laterally moves each lane icon LpS, LpM, LpG. Each lane icon LpS, LpM, LpG moves to the opposite side to the movement direction of the subject vehicle Am with respect to the subject vehicle icon IcS whose display position is fixed. For example, when the subject vehicle Am makes a lane change rightward, each lane icon LpS, LpM, LpG moves leftward with respect to the subject vehicle icon IcS.

In addition, the presentation control unit 88 adds an on-the-move icon IcR on the basis of start of lateral movement of the subject vehicle Am. The on-the-move icon IcR is displayed on the left or right side of the subject vehicle icon IcS and indicates a movement direction of the subject vehicle Am by the disposition thereof lined with the subject vehicle icon IcS. For example, when the subject vehicle Am moves rightward in an automatic lane change, the on-the-move icon IcR is displayed on the right side of the subject icon IcS to notify of rightward lateral movement. The on-the-move icon IcR is displayed in such a mode that the on-the-move icon is pasted on an intermediate lane Ln2 reproduced in the subject vehicle status StA.

At passage time t1*m* (Refer to FIG. 7) when the subject vehicle Am has gone across a partition line and the possibility of interruption of automatic lane change under way is eliminated, the presentation control unit 88 hides one (left) origin lane icon LpS (Refer to broken line in FIG. 9). In other words, the presentation control unit 88 continues display of both the left and right origin lane icons LpS to continuously reproduce the initial lane Ln1 in the subject vehicle status StA until the possibility of interruption is eliminated. When the possibility of interruption is eliminated, the presentation control unit 88 causes the initial lane Ln1 to vanish from the subject vehicle status StA.

Figure 10:
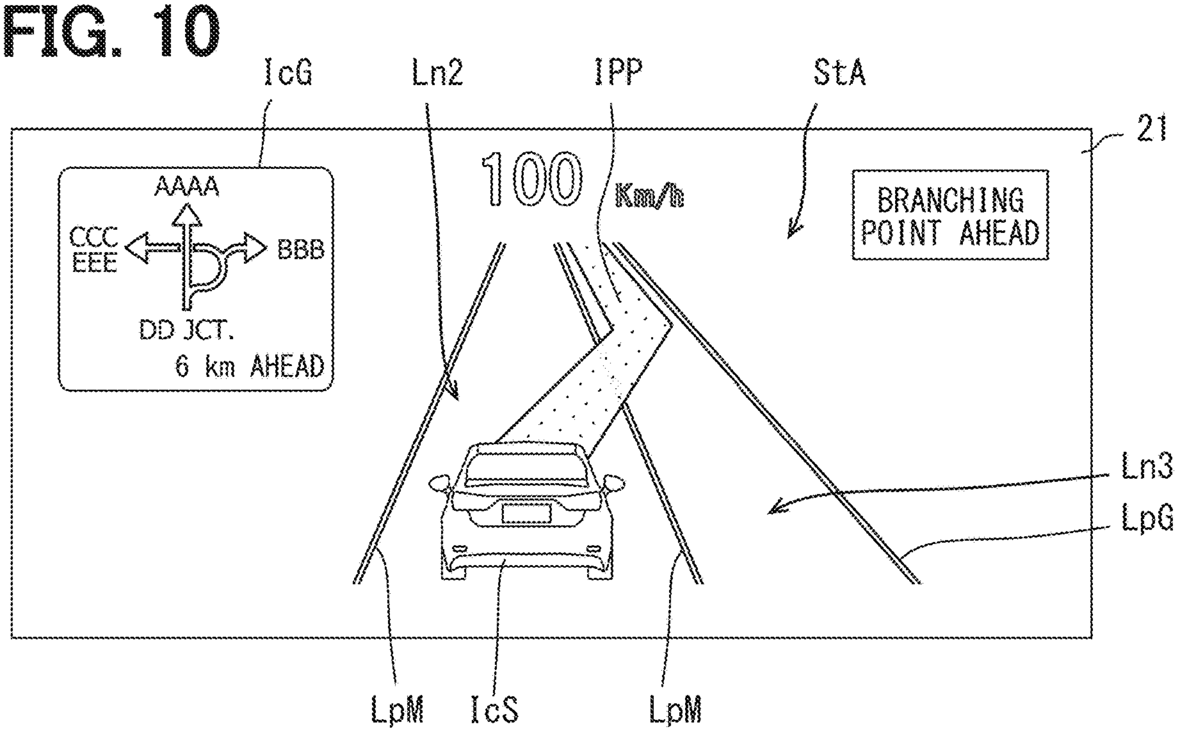
FIG. 10 is a drawing illustrating an example of a subject vehicle status in which guidance is provided for a second automatic lane change.

At a first completion point P1*f* (first completion time t1*f*) where the first lane change is completed as the result of movement to the intermediate lane Ln2 of the subject vehicle Am, the presentation control unit 88 alters the subject vehicle status StA from continuous LC display to display guiding the second automatic lane change (Refer to FIG. 10). In this display, the presentation control unit 88 hides the on-the-move icon IcR and further so changes the shape of the planned path IPP as to extend from the intermediate lane Ln2 to the arrival lane Ln3.

Figure 11:
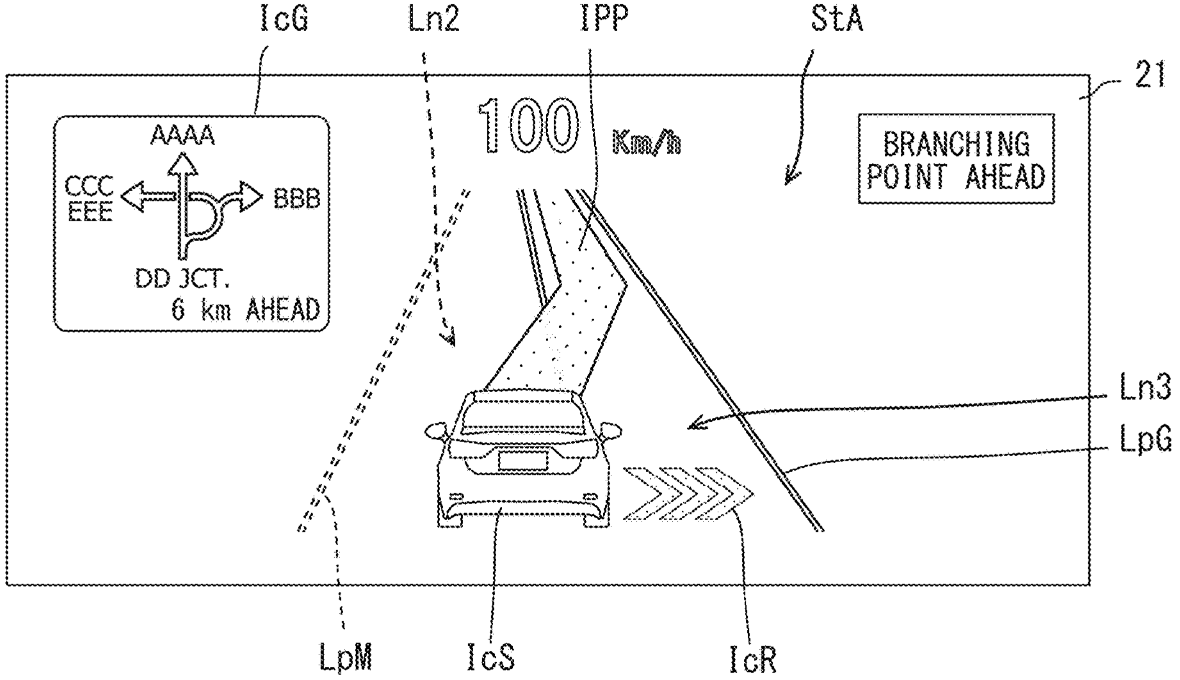
FIG. 11 is a drawing illustrating display transition of the display shown in FIG. 10.

Further, when after time (hereafter, referred to as second start time t2*s*, refer to FIG. 7) when the subject vehicle Am arrives at the second start point P2*s*, lateral movement of the subject vehicle Am is restarted, the presentation control unit 88 further alters a mode of the subject vehicle status StA (Refer to FIG. 11). In the subject vehicle status StA, the presentation control unit 88 laterally moves each lane icon LpM, LpG and displays the on-the-move icon IcR again in such a mode that the on-the-move icon is pasted on the arrival lane Ln3. At passage time t2*m* (Refer to FIG. 7) when the possibility of interruption of the second automatic lane change is eliminated, the presentation control unit 88 terminates display of one (left) adjacent lane icon LpM (Refer to broken line in FIG. 11) and causes the intermediate lane Ln2 to vanish from the subject vehicle status StA. At a second completion point P2*f* (second completion time t2*f*) where the continuous LC is completed as the result of movement to the arrival lane Ln3 of the subject vehicle Am, the presentation control unit 88 alters the subject vehicle status StA to the normal display mode and terminates the guidance for automatic lane change.

Figure 12:
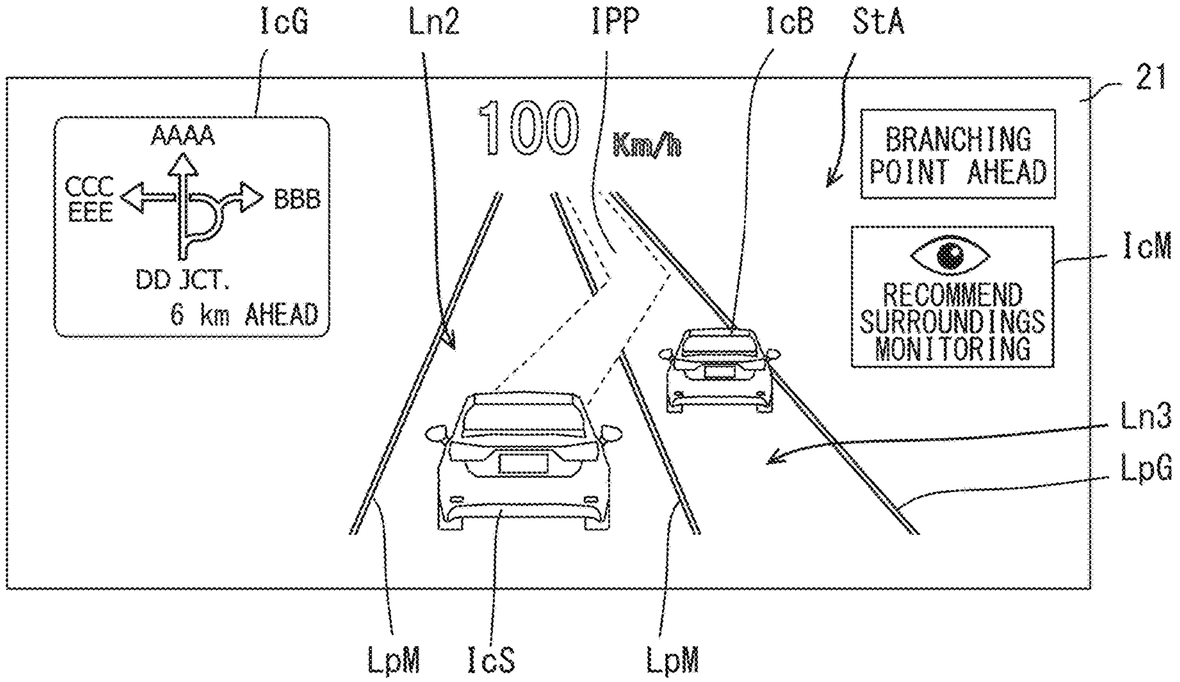
FIG. 12 is a drawing illustrating an example of monitoring recommending notification made when a second automatic lane change is brought into a standby state.
Figure 13:
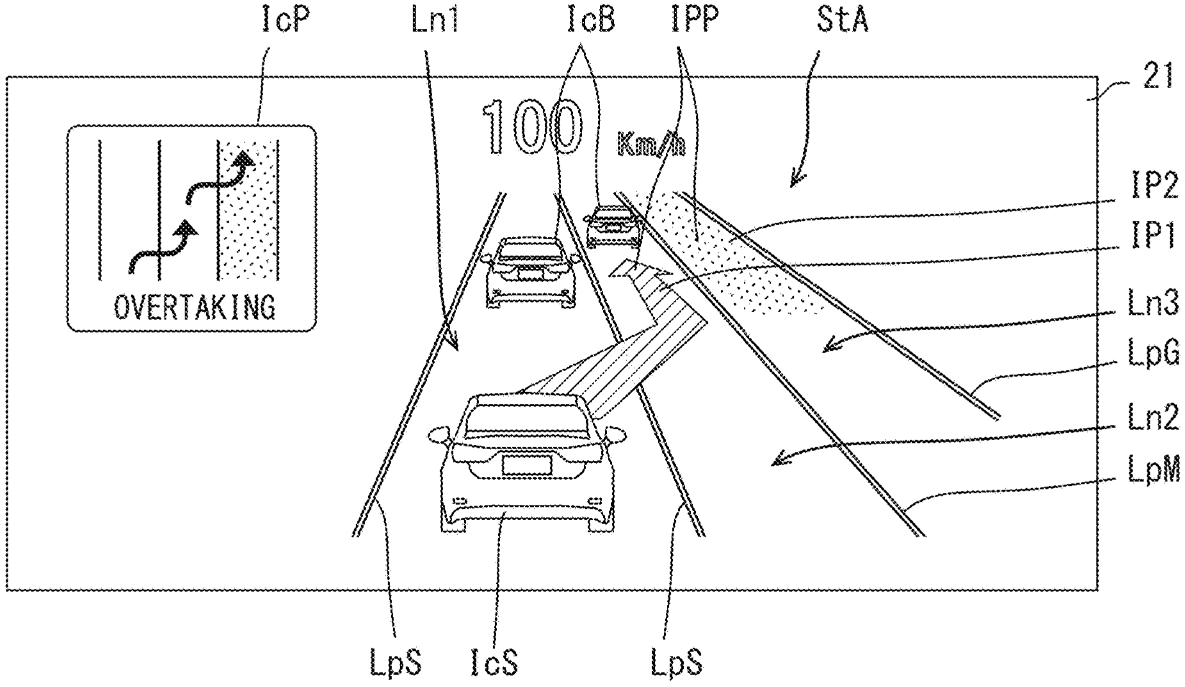
FIG. 13 is a drawing illustrating another example of a subject vehicle status in which continuous LC display is performed.

When after completion of the first automatic lane change, the second automatic lane change is brought into a standby state (Refer to S132 in FIG. 6), the presentation control unit 88 notifies the driver that the automatic lane change is in a standby state by display change to reduce the visual attraction of the planned path IPP (Refer to FIG. 12). Further, the presentation control unit 88 adds another vehicle icon IcB and a monitoring recommending icon IcM to the subject vehicle status StA to make monitoring recommending notification prompting the driver to monitor the surroundings.

The other vehicle icon IcB is displayed in the vicinity of the subject vehicle icon IcS based on a result of recognition of other vehicles in the vicinity of the subject vehicle by the other vehicle grasping unit 72. When any other vehicle is not present in the vicinity of the subject vehicle, the other vehicle icon IcB is not displayed. The display position of the other vehicle icon IcB relative to the subject vehicle icon IcS indicates a relative position of the other vehicle relative to the subject vehicle Am. Disposition of the other vehicle icon IcB in the arrival lane Ln3 indicates that another vehicle causing the standby state is present in the arrival lane Ln3.

The monitoring recommending icon IcM recommends a driver to preliminarily monitor the surroundings in a situation in which the driver is actually not obligated to monitor the surroundings. In cases where the second automatic lane change is once brought into a standby state, the presentation control unit 88 continues display of the monitoring recommending icon IcM even after movement to the arrival lane Ln3 is started. As a result, the monitoring recommending notification is continued till the second completion time t2*f* when movement to the arrival lane Ln3 is completed. The monitoring recommending notification is made only when a plurality of times of automatic lane change are planned and is not made when only one time of automatic lane change is planned.

(Continuous LC Display in Conjunction with Overtaking)

When continuous LC is made in conjunction with overtaking a vehicle ahead and a front lateral vehicle, an LC advance notification (Refer to FIG. 7) is not made. The presentation control unit 88 respectively takes a point where and time when a first automatic lane change becomes feasible as a first start point P1*s* and first start time t1*s* and starts continuous LC display (Refer to FIG. 13) by a subject vehicle status StA. The continuous LC display in this case includes such image portions as other vehicle icon IcB, overtaking notification icon IcP, and the like in addition to the subject vehicle icon IcS and each lane icon LpS, LpM, LpG. Further, when continuous LC is made in conjunction with overtaking, the planned path IPP is displayed in such a mode that the planned path is divided into a plurality of parts.

The other vehicle icon IcB is an image portion indicating the presence of a vehicle ahead and a front lateral vehicle to overtake. The other vehicle icon IcB is displayed respectively in the initial lane Ln1 and the intermediate lane Ln2. When any other vehicle than the vehicle ahead and the front lateral vehicle is present in the vicinity of the subject vehicle, the other vehicle icon IcB indicating the presence of such other vehicle may be further displayed.

Like the guide sign icon IcG (Refer to FIG. 8), the overtaking notification icon IcP is contents notifying a driver of the reason why a plurality of times of automatic lane change are made. Specifically, the overtaking notification icon IcP includes an arrow causing execution of lane change to be imagined and a character message. The overtaking notification icon IcP notifies a driver that an automatic lane change will be made for overtaking.

The planned path IPP is so configured as to include: an arrow-shaped first path IP1 extended from the initial lane Ln1 to the intermediate lane Ln2 reproduced in the subject vehicle status StA; and a second advance notification icon IP2 displayed in superimposition on the arrival lane Ln3. In continuous LC in conjunction with overtaking, the second start point P2*s* (second start time t2*s*) where the second automatic lane change is started dynamically varies; therefore, the planned path IPP is divided into the first path IP1 and the second advance notification icon IP2. The second advance notification icon IP2 is displayed in the subject vehicle status StA in accordance with start of the first automatic lane change; the driver is thereby notified of an execution plan of the second automatic lane change. Like the first path IP1, the second advance notification icon IP2 may be in a shape of an arrow extending from the intermediate lane Ln2 to the arrival lane Ln3 (Refer also to FIG. 21).

Figure 14:
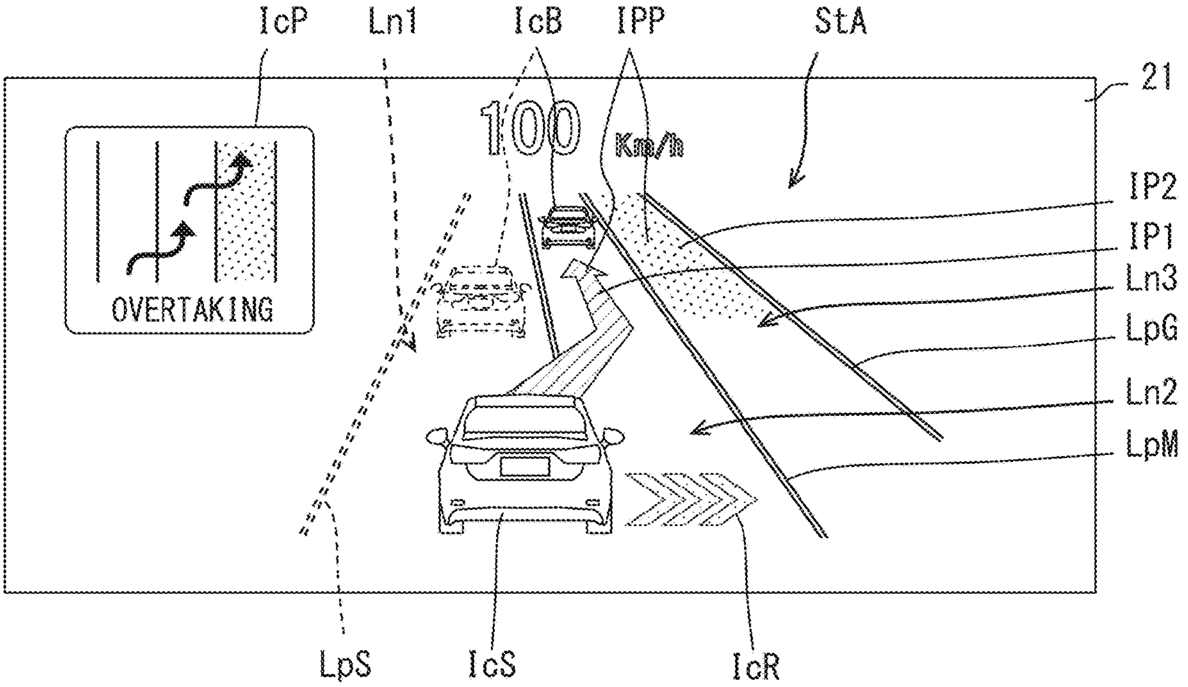
FIG. 14 is a drawing illustrating display transition of the continuous LC display shown in FIG. 13.

Based on start of lateral movement of the subject vehicle Am, the presentation control unit 88 starts lateral movement of each lane icon LpS, LpM, LpG and further, additionally displays the on-the-move icon IcR (Refer to FIG. 14). At passage time t1$m$ (Refer to FIG. 7) when the subject vehicle Am has gone across a partition line and the possibility of interruption of the automatic lane change is eliminated, the presentation control unit 88 hides one (left) origin lane icon LpS and the other vehicle icon IcB indicating the vehicle ahead. As the result of the foregoing, the initial lane Ln1 vanishes from the subject vehicle status StA.

Figure 15:
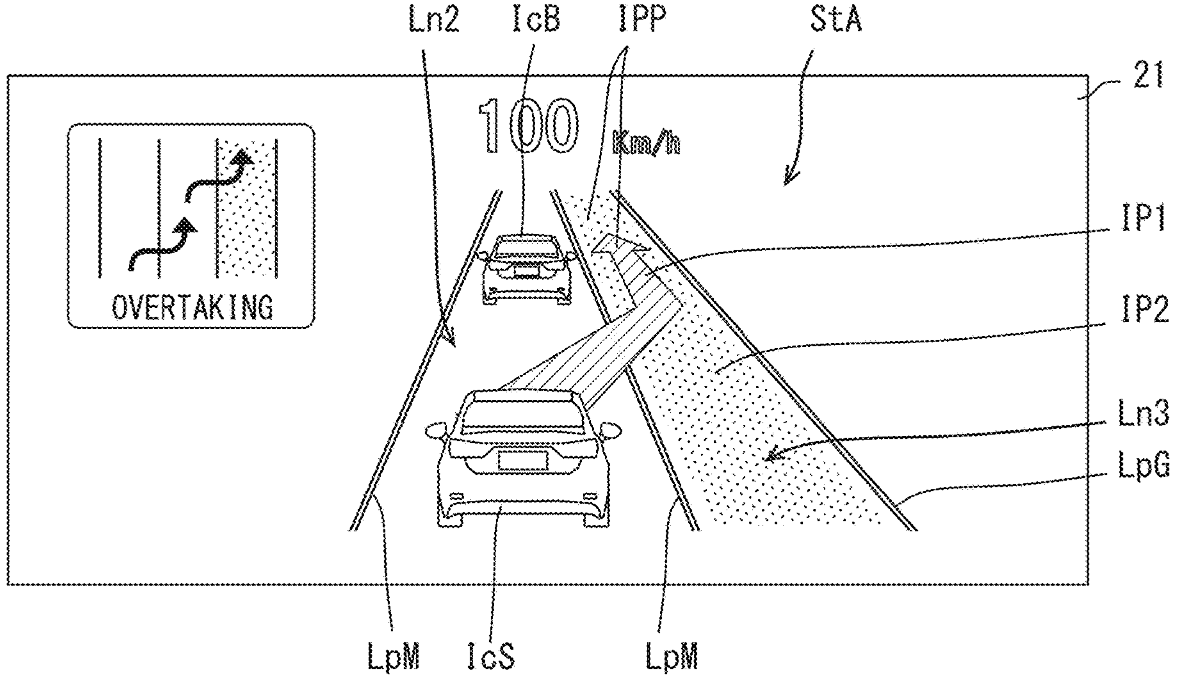
FIG. 15 is a drawing illustrating another example of a subject vehicle status in which guidance is provided for a second automatic lane change.

At the first completion point P1$f$ (first completion time t1$f$) where the first lane change is completed, the presentation control unit 88 alters the subject vehicle status StA to display guiding the second lane change (Refer to FIG. 15). The presentation control unit 88 hides the on-the-move icon IcR and further displays the first path IP1 in a shape of an arrow extended from the intermediate lane Ln2 to the arrival lane Ln3. The presentation control unit 88 may display the first path IP1 in superimposition on the second advance notification icon IP2 or may cause the second advance notification icon IP2 to make transition to a hidden state.

At the second start time (Refer to FIG. 7) when the second automatic lane change is started, the presentation control unit 88 starts lateral movement of each lane icon LpM, LpG and regeneration of the on-the-move icon IcR (Refer to FIG. 11). At passage time t2$m$ (Refer to FIG. 7) when the possibility of interruption of the second automatic lane change is eliminated, the presentation control unit 88 terminates display of one (left) adjacent lane icon LpM and causes the intermediate lane Ln2 to vanish from the subject vehicle status StA. Further, at the second completion time (Refer to FIG. 7) when as the result of movement to the arrival lane Ln3, the continuous LC is completed, the presentation control unit 88 alters the subject vehicle status StA to the normal display mode and terminates the guidance for automatic lane change.

Also, in continuous LC in conjunction with overtaking, when the second lane change is brought into a standby state, the presentation control unit 88 makes monitoring recommending notification to prompt the driver to monitor the surroundings. In this case, the presentation control unit 88 reduces the visual attraction of the first path IP1 and the second advance notification icon IP2 and further adds the monitoring recommending icon IcM and the other vehicle icon IcB indicating any other vehicle that has hindered the lane change to the subject vehicle status StA.

Figure 16:
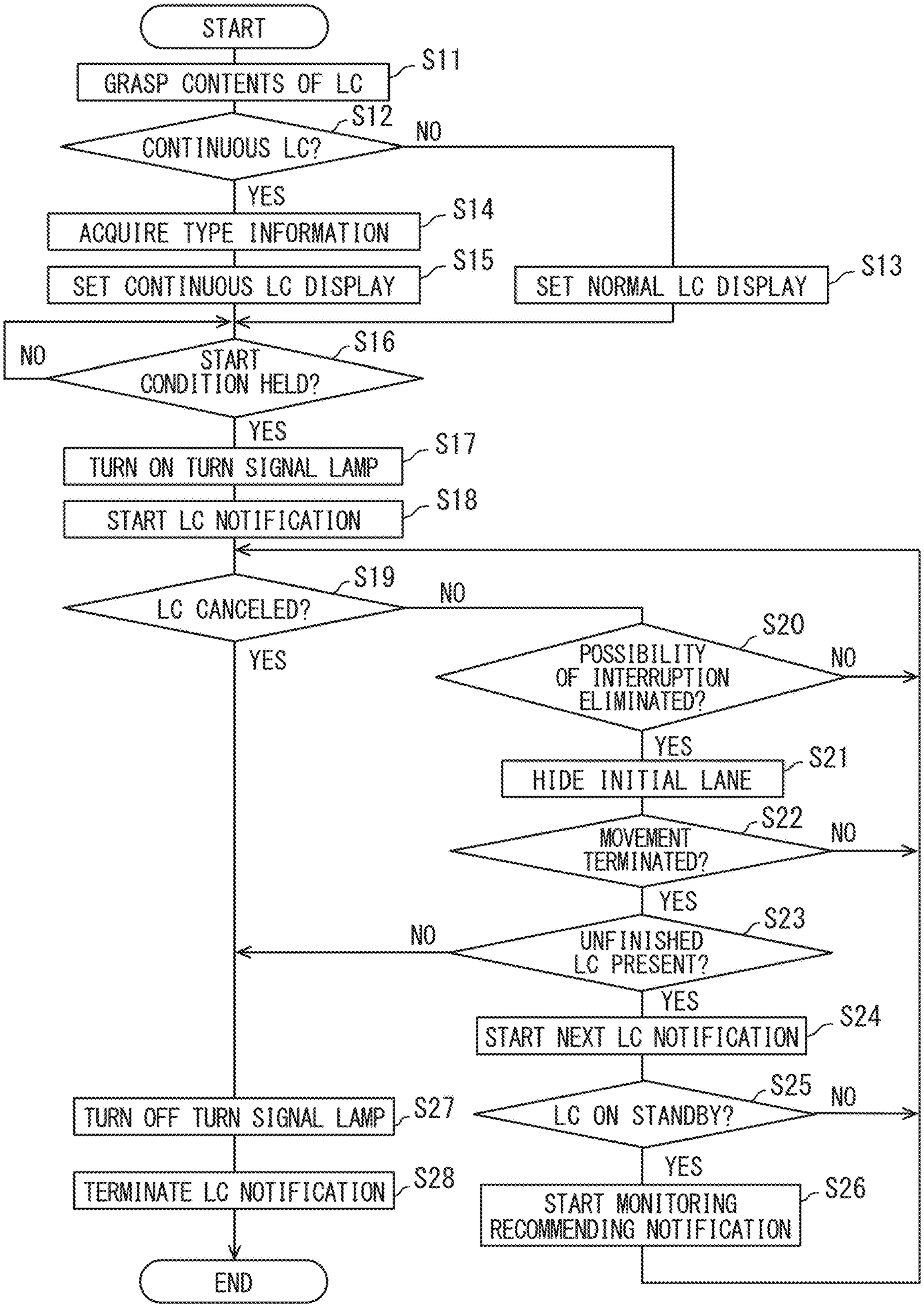
FIG. 16 is a flowchart illustrating the details of display control processing performed at a HCU.

Hereafter, a description will be given to the details of display control processing that implements the above-mentioned display transition of the subject vehicle status StA based on FIG. 16 with reference to FIG. 3 and FIG. 7 to FIG. 15. The display control processing is started by the information linkage unit 82, the presentation control unit 88, and the like before the first start time t1$s$ on the basis of, for example, approach to the first start point P1$s$.

The information linkage unit 82 refers to a plan for automatic lane change generated by the lane change control unit 79 and grasps the details of the automatic lane change made by autonomous travel control (S11). Based on the grasped details of the automatic lane change, the information linkage unit 82 determines whether continuous LC has been planned (S12). When only one time of automatic lane change is planned (S12: NO), the presentation control unit 88 makes display setting of a subject vehicle status StA guiding normal (only one time) automatic lane change (S13).

Meanwhile, when continuous LC is planned (S12: YES), the information linkage unit 82 acquires type information indicating a type of the continuous LC (S14). The type information is information indicating whether the continuous LC is continuous LC in conjunction with approach to an LC required point P3 or continuous LC in conjunction with overtaking. Based on the type information, the information linkage unit 82 grasps the reason why a plurality of times of automatic lane change are made. When continuous LC is planned, the presentation control unit 88 makes display setting of a subject vehicle status StA so that continuous LC display corresponding to the type of the continuous LC is made.

The presentation control unit 88 determines whether a start condition for notification of automatic lane change has held (S16). For example, when the subject vehicle Am arrives at the first start point P1$s$, the presentation control unit 88 determines that the start condition has held (S16: YES). In this case, the request processing unit 84 starts flashing of the turn signal lamp 44 corresponding to a movement direction of the subject vehicle Am in the automatic lane change by outputting a request toward the body ECU 43 (S17). Further, the presentation control unit 88 alters the display of the subject vehicle status StA to a mode for notifying of automatic lane change based on display setting at S13 or S15 (S18). When continuous LC is notified, the presentation control unit 88 starts display of the subject vehicle status StA corresponding to the grasped reason for execution of continuous LC. As a result, when continuous LC is made to select an appropriate route, the presentation control unit 88 switches the subject vehicle status StA to a subject vehicle status including the guide sign icon IcG (Refer to FIG. 8). Meanwhile, when continuous LC is made for overtaking, the presentation control unit 88 switches the subject vehicle status StA to a subject vehicle status including the overtaking notification icon IcP (Refer to FIG. 13).

The information linkage unit 82 determines whether the automatic lane change has been canceled (Refer to S134 in FIG. 6) at the automatic driving ECU 50$b$ (S19). When the automatic lane change has been canceled (S19: YES), the request processing unit 84 terminates flashing of the turn signal lamp 44 by outputting a request toward the body ECU 43 (S27). Further, the presentation control unit 88 alters the subject vehicle status StA to the normal mode and terminates the notification of the automatic lane change (S28).

Meanwhile, when the automatic lane change is continued (S19: NO), the information linkage unit 82 further gasps the presence/absence (presence or absence) of the possibility of interruption of the automatic lane change and determines whether the possibility of interruption of the automatic lane change has vanished (S20). The information linkage unit 82 continuously determines whether the automatic lane change has been canceled until the possibility of interruption vanishes. When the possibility of interruption has vanished (S20: YES), the presentation control unit 88 hides the initial lane Ln in the subject vehicle status StA (S21, refer to FIG. 9 and FIG. 14).

The information linkage unit 82 determines whether the lane-to-lane movement under way has terminated (S22). When it is determined that the lane-to-lane movement has terminated (S22: YES), the information linkage unit 82 further grasps the presence/absence of an automatic lane change that has not been made. When only one time of automatic lane change has completed or when the second automatic lane change in continuous LC has completed, the information linkage unit 82 determines that an automatic lane change that has not been made is absent (S23: NO). In this case, flashing of the turn signal lamp 44 is terminated (S27) and further the notification of the automatic lane change is also terminated (S28).

Meanwhile, when an automatic lane change that has not been made is present (S23: YES), the presentation control unit 88 so alters the subject vehicle status StA as to notify of the next automatic lane change (S24, refer to FIG. 10 and FIG. 15). Further, the information linkage unit 82 determines whether the next automatic lane change is in a standby state (S25). When the next automatic lane change is not in a standby state (S25: NO), the processing of S19 to S23 is performed again. Meanwhile, when the automatic lane change has been in a standby state (S25: YES), the presentation control unit 88 additionally displays the monitoring recommending icon IcM to start monitoring recommending notification (S26, refer to FIG. 12). Then, the processing of S19 to S23 is performed again. Further, after the termination of the last (second) automatic lane change, flashing of the turn signal lamp 44 is terminated (S27) and further the notification of automatic lane change is also terminated (S28). When continuous LC is planned, as mentioned above, the operation of the turn signal lamp 44 is continued until a plurality of times of planned automatic lane change are completed.

In the first embodiment described up to this point, in case of continuous LC in which a plurality of times of automatic lane change are continued within a predetermined section or within a predetermined time, such an occupant as a driver can grasp an execution plan of a plurality of times of the automatic lane change by notification made in accordance with the first automatic lane change. Therefore, the occupant can determine that the plurality of times of automatic lane change are a behavior under normal control. As a result, the occupant's anxiety can be suppressed even when a plurality of times of automatic lane change are made.

In the first embodiment, in addition, continuous LC display (Refer to FIG. 8 and FIG. 13) showing an execution plan of a plurality of times of lane change is presented at substantially the same time as start of the first automatic lane change or slightly before start of the first automatic lane change. Therefore, the occupant can grasp that a plurality of times of lane change are to be made with a time margin. Therefore, the effect of reduction of an occupant's anxiety is more easily exhibited.

In the first embodiment, when a plurality of times of lane change are planned, monitoring recommending notification is made to prompt a driver to monitor the surroundings. By prompting execution of surroundings monitoring by such monitoring recommending notification, even in a situation in which surrounding monitoring is not obligated, an occupant can grasp the situation of the vicinity of the subject vehicle; therefore, even when an automatic lane change is repeated, the occupant is less prone to feel anxiety. Meanwhile, when only one time of automatic lane change is planned, execution of monitoring recommending notification is restricted. Therefore, the convenience of automatic driving can also be ensured.

In the first embodiment, when after completion of the first automatic lane change, the second automatic lane change is brought into a standby state, monitoring recommending notification is made to prompt a driver to monitor the surroundings. Conversely, when after completion of the first automatic lane change, the second automatic lane change is not brought into a standby state, execution of monitoring recommending notification is restricted. When monitoring recommending notification is made only in a scene in which the second automatic lane change is high in difficulty as mentioned above, the maintenance of the convenience of automatic driving and suppression of an occupant's anxiety can be both achieved.

In the first embodiment, a subject vehicle status StA indicating the situation of the vicinity of the subject vehicle Am is displayed by the meter display 21. When a plurality of times of automatic lane change are planned, the destination lane icon LpG reproducing an arrival lane Ln3 at which arrival is made by repetition of automatic lane change is displayed in the subject vehicle status StA in accordance with the first automatic lane change. According to such display, an occupant can easily judge that a plurality of times of the automatic lane change is a behavior under normal control. As a result, the occupant's anxiety can be suppressed even when a plurality of times of automatic lane change are made.

In the first embodiment, when the first lane change can be interrupted, display of the origin lane icon LpS reproducing the initial lane Ln1 as the start point of continuous LC in the subject vehicle status StA is continued. When the possibility of interruption of the first automatic lane change is eliminated, the origin lane icon LpS is hidden. According to such display alteration of the subject vehicle status StA, normal operation of continuous LC by the automatic driving system 50 can be shown to an occupant. As a result, the occupant's anxiety can be further suppressed.

When a plurality of times of automatic lane change are planned, in the first embodiment, the contents of notification are altered according to the reason why a plurality of times of the automatic lane change are made. As a result, an occupant can grasp the reason for execution of the continuous LC to be made; therefore, the occupant is less prone to feel anxiety even in a scene in which an automatic lane change is repeated.

When a plurality of times of automatic lane change are planned within a predetermined section or within a predetermined time, in the first embodiment, the operation of the turn signal lamp 44 indicating the movement direction of the subject vehicle Am is continued until a plurality of times of the planned automatic lane change are completed. Also, owing to such continuing operation of the turn signal lamp 44, an occupant can determine that a plurality of times of the automatic lane change are a behavior under planned normal control. As a result, the occupant's anxiety can be suppressed even when a plurality of times of automatic lane change are made.

In the first embodiment, the meter display 21 is equivalent to "display device"; the information linkage unit 82 is equivalent to "control grasping unit"; the request processing unit 84 is equivalent to "indicator control unit"; and the presentation control unit 88 is equivalent to "notification implementation unit." The destination lane icon LpG is equivalent to "destination lane image portion"; the origin lane icon LpS is equivalent to "origin lane image portion"; the subject vehicle status StA is equivalent to "bird's-eye view contents"; and the HCU 100 is equivalent to "presentation control device."

Second Embodiment

Figure 17:
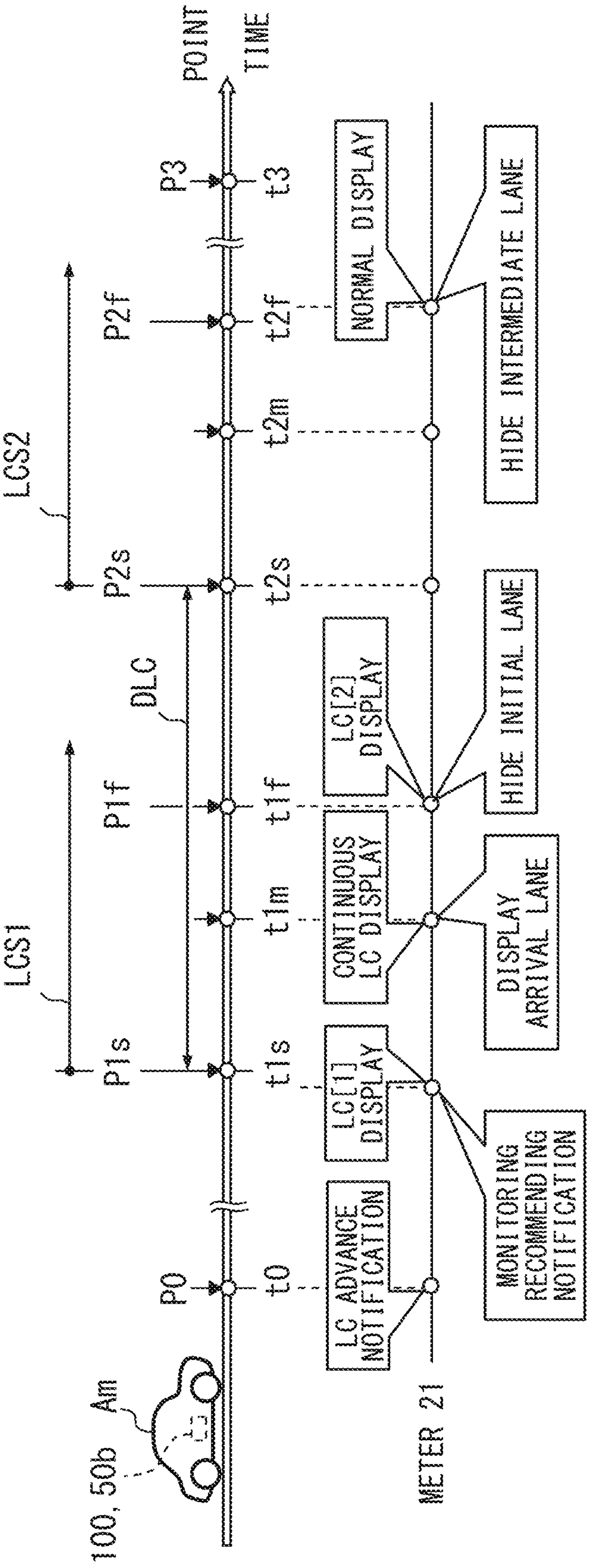
FIG. 17 is a timing chart for explaining display transition of a subject vehicle status in continuous LC according to a second embodiment.

The second embodiment of the present disclosure is a modification to the first embodiment. In the second embodiment, after start of the first automatic lane change and before termination of the first automatic lane change, continuous LC display by a subject vehicle status StA is started to notify of an execution plan of continuous LC. Hereafter, a description will be given to the details of each display transition of the subject vehicle status StA according to the second embodiment based on FIG. 18 to FIG. 21 with reference to FIG. 3 and FIG. 17.

(Continuous LC Display in Conjunction with Approach to LC Required Point P3)

Figure 18:
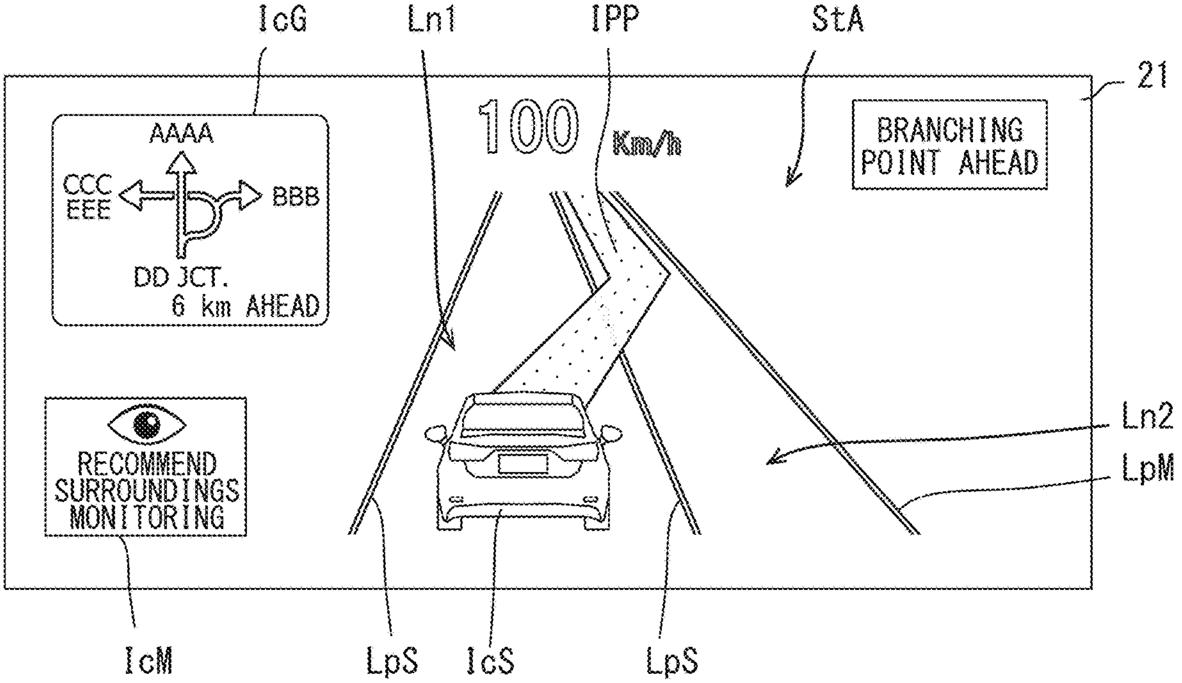
FIG. 18 is a drawing illustrating an example of subject vehicle status in which guidance is provided for a first automatic lane change in continuous LC.

When continuous LC is made in conjunction with approach to an LC required point P3, the presentation control unit 88 alters the subject vehicle status StA to display notifying of the first automatic lane change at first start time t1*s* or immediately therebefore (Refer to FIG. 18). At this time, the subject vehicle status StA displays the subject vehicle icon IcS, origin lane icons LpS, an adjacent lane icon LpM, a guide sign icon IcG, and the like.

The presentation control unit 88 starts monitoring recommending notification prompting a driver to monitor the surroundings at the first start time t1*s* by additionally displaying the monitoring recommending icon IcM. At the first start time t1*s*, the presentation control unit 88 does not start display of a destination lane icon LpG. As a result, a planned path IPP is displayed in such a shape that the path is extended from the initial lane Ln1 to an intermediate lane Ln2 reproduced in the subject vehicle status StA.

Figure 19:
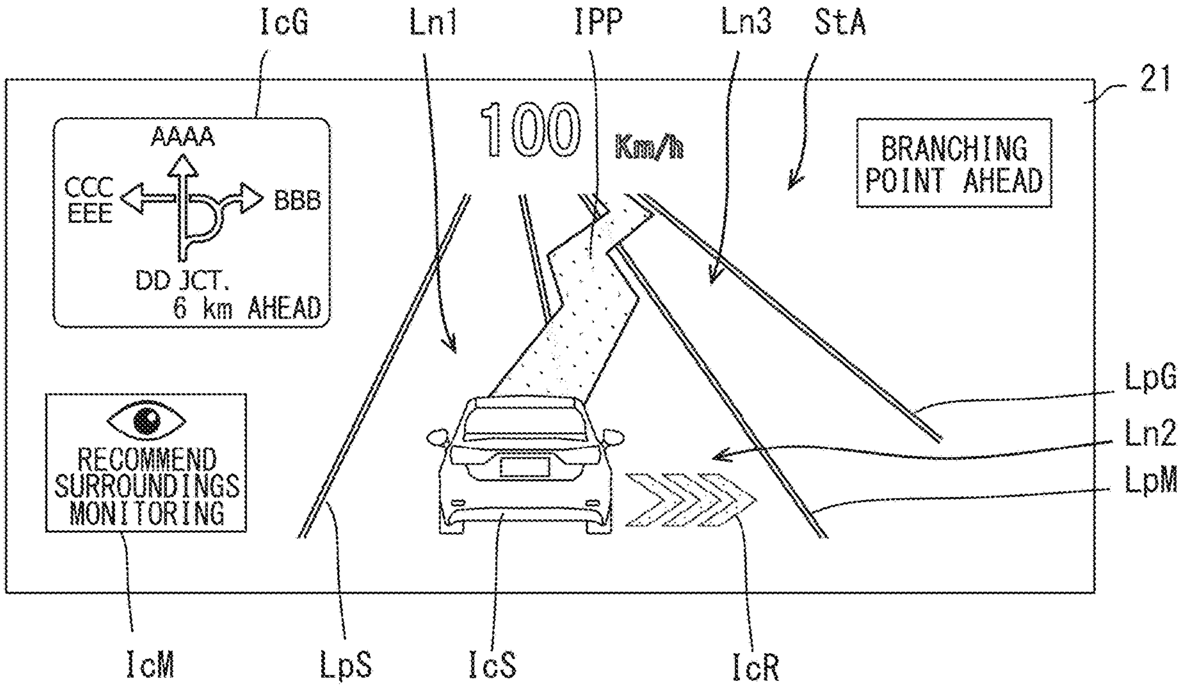
FIG. 19 is a drawing illustrating a further another example of a subject vehicle status in which continuous LC display is performed.

At passage time t1*m* when the subject vehicle Am goes across a partition line and the possibility of the first interruption is eliminated, the presentation control unit 88 starts continuous LC display by the subject vehicle status StA (Refer to FIG. 19). At this time, the presentation control unit 88 reproduces the arrival lane Ln3 in the subject vehicle status StA by starting display of the destination lane icon LpG. Further, the presentation control unit 88 extends the planned path IPP to an arrival lane Ln3.

At first completion time t1*f* when the first lane change is completed, the presentation control unit 88 alters the subject vehicle status StA from continuous LC display to display guiding the second automatic lane change. In this display, the presentation control unit 88 hides the on-the-move icon IcR and the origin lane icon LpS and causes the initial lane Ln1 to vanish from the subject vehicle status StA. In addition, the presentation control unit 88 displays the planned path IPP in such a shape that the path is extended from the intermediate lane Ln2 to the arrival lane Ln3.

At second start time t2*s* when the second automatic lane change is started, the presentation control unit 88 starts lateral movement of each lane icon LpM, LpG and regeneration of the on-the-move icon IcR. At second completion time t2*f* when the continuous LC is completed by movement to the arrival lane Ln3, the presentation control unit 88 hides the on-the-move icon IcR and the adjacent lane icon LpM and causes the intermediate lane Ln2 to vanish from the subject vehicle status StA. As the result of the foregoing, the subject vehicle status StA returns to the normal display mode and the guidance for a series of the automatic lane changes is terminated.

(Continuous LC Display in Conjunction with Overtaking)

Figure 20:
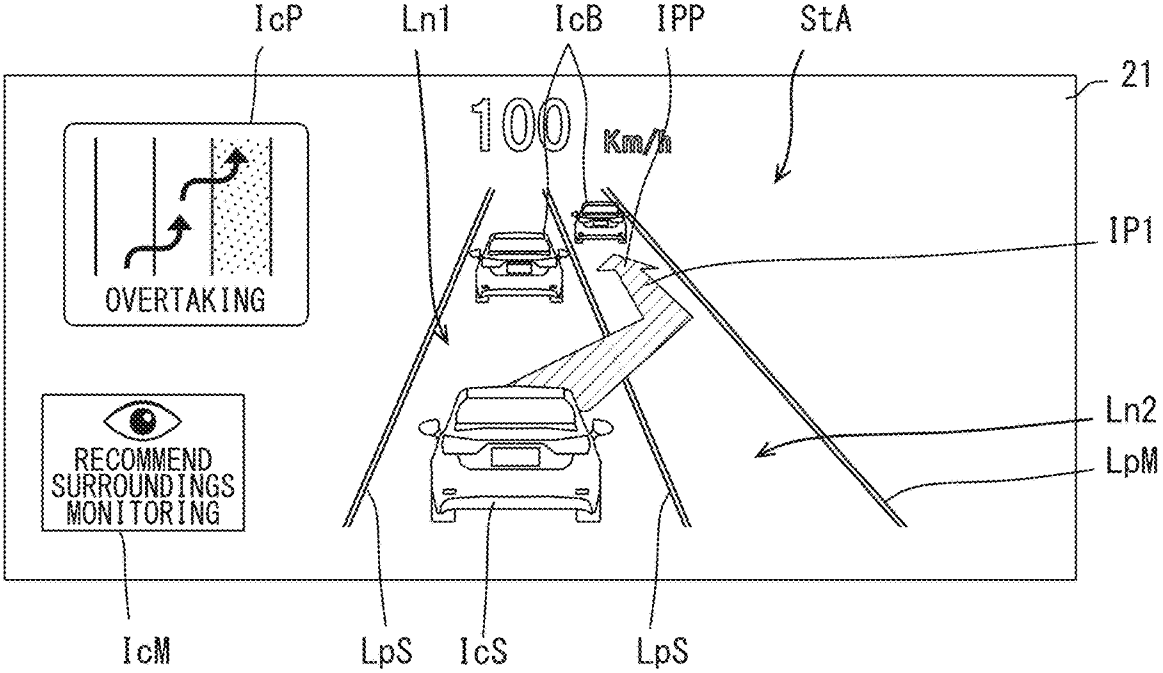
FIG. 20 is a drawing illustrating another example of a subject vehicle status in which guidance is provided for a first automatic lane change in continuous LC.

Even in cases where continuous LC is made in conjunction with overtaking, the presentation control unit 88 alters display of the subject vehicle status StA at the first start point P1*s* or immediately therebefore (Refer to FIG. 20). The presentation control unit 88 displays the overtaking notification icon IcP and the monitoring recommending icon IcM in the meter display 21 in addition to the subject vehicle icon IcS, the other vehicle icon IcB, each lane icon LpS, LpM, and the like. In addition, the presentation control unit 88 displays, as the planned path IPP, a first path IP1 in a shape of an arrow extended from the initial lane Ln1 to the intermediate lane Ln2 reproduced in the subject vehicle status StA.

Figure 21:
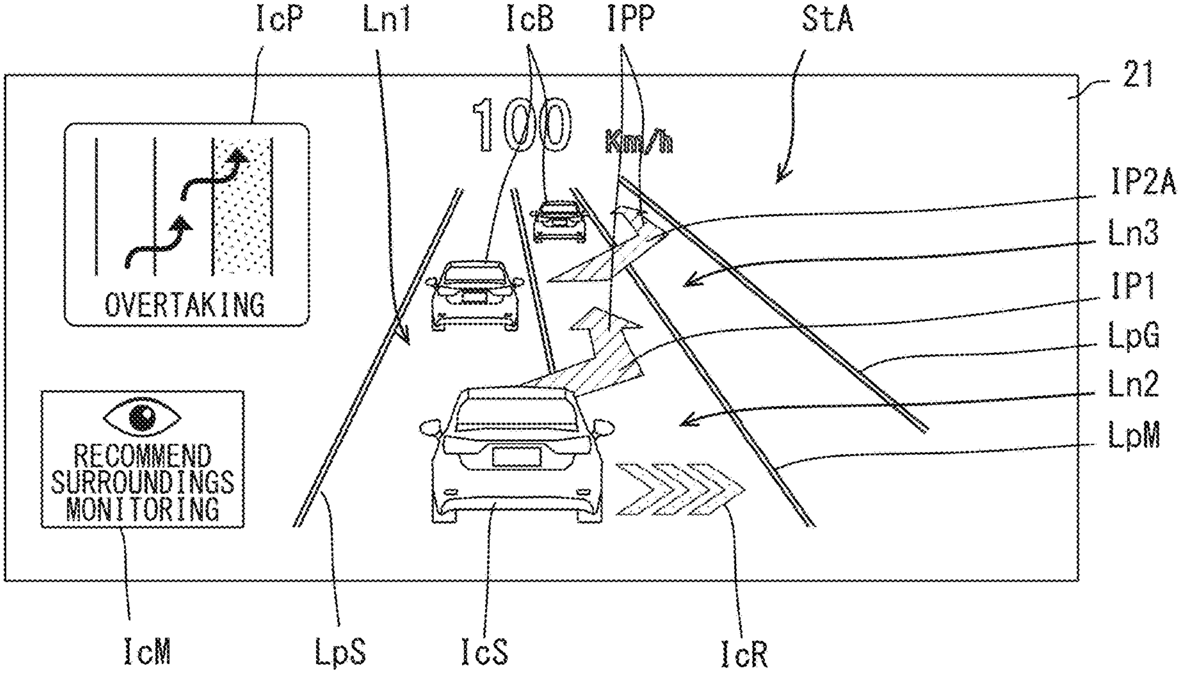
FIG. 21 is a drawing illustrating a further another example of a subject vehicle status in which continuous LC display is performed.

At the passage time t1*m*, the presentation control unit 88 starts notification of an execution plan of continuous LC by the subject vehicle status StA (Refer to FIG. 21). At this time, the presentation control unit 88 reproduces the arrival lane Ln3 in the subject vehicle status StA by starting display of the destination lane icon LpG. The presentation control unit 88 further displays, as the planned path IPP, a second path IP2A in a shape of an arrow extended from the intermediate lane Ln2 to the arrival lane Ln3.

At first completion time t1*f*, the presentation control unit 88 causes the initial lane Ln1 to vanish from the subject vehicle status StA and alters the subject vehicle status StA to display guiding the second automatic lane change. In this display, the second path IP2A maintains the shape extended from the intermediate lane Ln2 to the arrival lane Ln3. After guiding start of lateral movement of the subject vehicle Am at second completion time t2*f*, at the second completion time t2*f*, the presentation control unit 88 alters the subject vehicle status StA to the normal display mode and terminates the guidance for a series of the automatic lane changes.

Also, in the second embodiment described up to this point, the same effect as in the first embodiment is brought about and an occupant can judge that a plurality of times of the automatic lane change are a behavior under normal control by notification made in accordance with the first automatic lane change. As a result, the occupant's anxiety can be suppressed even when a plurality of times of automatic lane change are made.

In the second embodiment, in addition, after start of the first automatic lane change and during execution of this automatic lane change, continuous LC display (Refer to FIG. 19 and FIG. 21) showing an execution plan of a plurality of times of automatic lane change is presented. Therefore, an occupant can grasp a plan of a repeatedly made automatic lane change step by step. As a result, grasping of information is facilitated and thus the effect of reduction of an occupant's anxiety is more easily exhibited.

When a plurality of times of automatic lane change are planned, in the second embodiment, monitoring recommending notification prompting a driver to monitor the surroundings is displayed in accordance with start of the initial automatic lane change. Therefore, when execution of continuous LC is planned, an occupant can early start to grasp the situation of the vicinity of the subject vehicle. As a result, even when an automatic lane change is continuously made, the occupant is less prone to feel anxiety.

In the second embodiment, the origin lane icon LpS reproducing the initial lane Ln1 as the start point of a plurality of times of automatic lane change in the subject vehicle status StA is hidden at the first completion time t1*f* after completion of the first automatic lane change. When the contents of the subject vehicle status StA vary according to progress of automatic lane change as mentioned above, an occupant can confirm that control related to automatic lane change is normally continuing to work by the subject vehicle status StA. Therefore, the occupant's anxiety about continuous LC can be further suppressed.

Third Embodiment

The third embodiment of the present disclosure is another modification to the first embodiment. When an automatic lane change need be repeated, the automatic driving ECU 50*b* shown in FIG. 2 and FIG. 7 ensures a sufficient execution interval DLC and thereby plans an automatic lane change so that a plurality of times of lane change will not be made within a predetermined section or within a predetermined time.

Specifically, when planning a plurality of times of lane change, the lane change control unit 79 sets a wider execution interval DLC from the first section LCS1 to the second section LCS2 than an execution interval DLC set when a plurality of times of automatic lane change by driving assist control are planned. For example, the driving assist ECU 50*a* sets an execution interval DLC to several minutes or shorter or 1 kilometer or shorter. Meanwhile, the lane change control unit 79 set an execution interval DLC to 5 minutes or longer or over 1 kilometer.

Meanwhile, when a vehicle behind doing so-called tailgating is grasped by the other vehicle grasping unit 72, the lane change control unit 79 plans an automatic lane change in which a plurality of times of automatic lane change are made within a predetermined section or within a predetermined time. For example, when the distance between the subject vehicle Am and a vehicle behind is narrower than a predetermined value, the other vehicle grasping unit 72 determines that the vehicle behind is tailgating. The predetermined value for the determination of tailgating may be constant or may be increased with increase in traveling speed relative to TTC (Time-To-Collision). When a vehicle behind is zigzagging, the other vehicle grasping unit 72 may determine that the vehicle behind is a tailgating vehicle.

When a tailgating vehicle is grasped behind at the other vehicle grasping unit 72, the lane change control unit 79 plans an automatic lane change for letting the tailgating vehicle go ahead. Specifically, the lane change control unit 79 plans two times of automatic lane change, temporarily evacuating from the initial lane Ln1 (Refer to FIG. 8) to an adjacent lane and after the tailgating vehicle passes the subject vehicle Am, returning from the adjacent lane to the initial lane Ln1. As the result of the foregoing, for example, when a tailgating vehicle is grasped while the subject vehicle Am is traveling along a traveling lane, continuous LC is made and the subject vehicle tentatively evacuates to a passing lane and then returns to the traveling lane.

Figure 22:
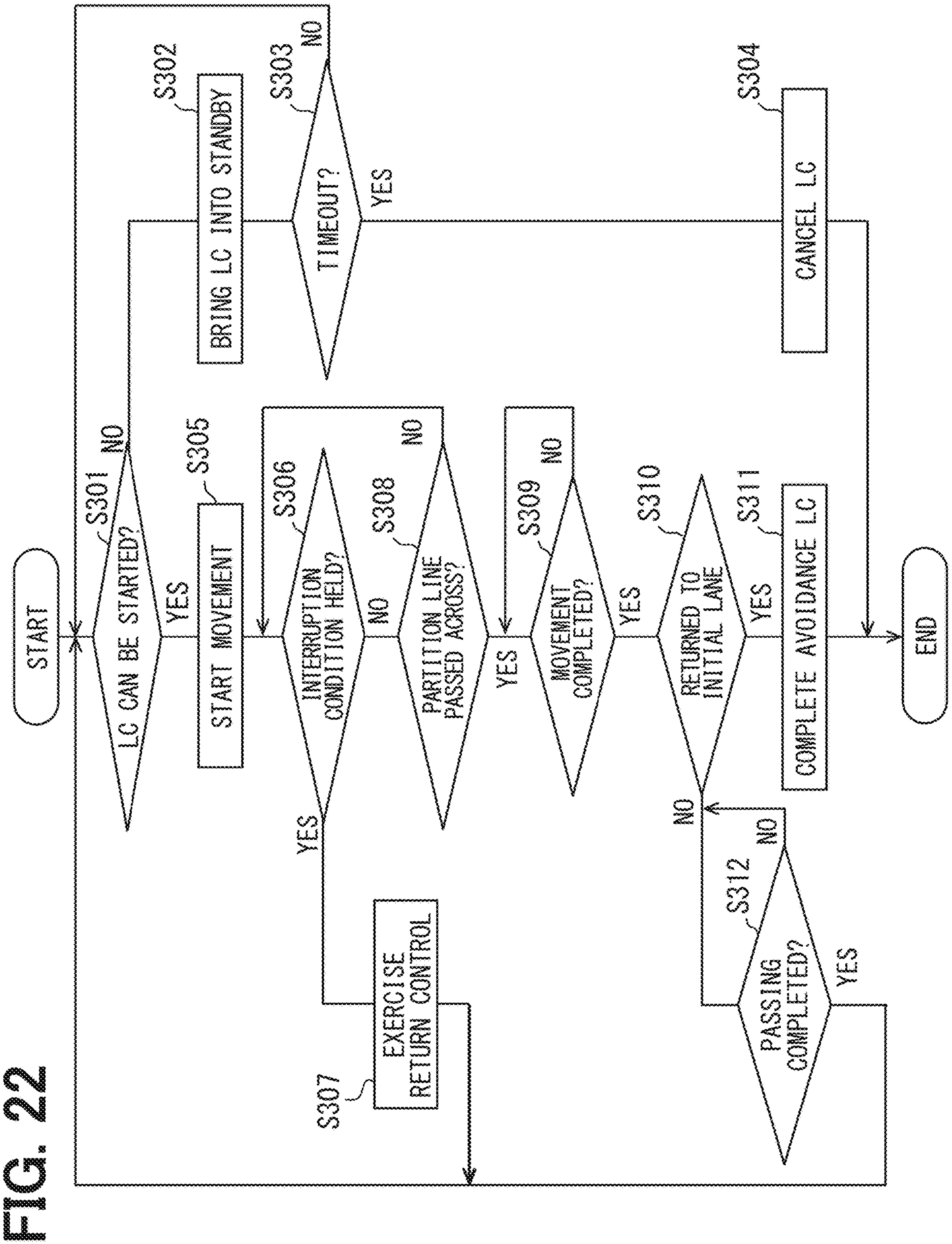
FIG. 22 is a flowchart illustrating the details of lane change execution processing performed at an automatic driving ECU in a third embodiment.

Based on generation of a lane change plan for avoidance of a tailgating vehicle, the lane change control unit 79 starts lane change execution processing (Refer to FIG. 22) in cooperation with the control implementation unit 64. In the lane change execution processing, the lane change control unit 79 determines whether an automatic lane change from the initial lane Ln1 to an adjacent lane can be started (S301). When a lateral vehicle is present in the adjacent lane as the destination of movement and an automatic lane change cannot be started (S301: NO), the lane change control unit 79 brings the automatic lane change into a standby state (S302). When a predetermine time has passed and the automatic lane change is brought into a timeout (S303: YES), the lane change control unit 79 cancels execution of the automatic lane change.

Meanwhile, when a lateral vehicle is not present in the adjacent lane as the destination of movement and an automatic lane change can be started (S301: YES), the control implementation unit 64 starts movement of the subject vehicle Am toward the adjacent lane (for example, the right passing lane) by steering control (S305). After start of lateral movement by the control implementation unit 64, the lane change control unit 79 determines whether an interruption condition for lane change has held (S306). When an interruption condition has held (S306: YES), the control implementation unit 64 interrupts lateral movement under way and exercises return control (S307). The lane change control unit 79 continues determination of whether an interruption condition has held until the subject vehicle Am goes across the partition line between the initial lane and the adjacent lane (S308: YES). When the subject vehicle Am arrives at substantially the center of the lane as the destination of movement, the lane change control unit 79 determines that the movement has completed (S309: YES).

The lane change control unit 79 determines whether the subject vehicle has returned to the initial lane Ln1, in other words, whether the second lane change has completed (S310). When only the movement to the adjacent lane has completed (S310: NO), the lane change control unit 79 determines whether passing of the tailgating vehicle (vehicle behind) by the subject vehicle Am has completed (S312). For example, based on the distance from the tailgating vehicle to the subject vehicle Am becoming equal to a predetermined value or larger, the other vehicle grasping unit 72 determines that passing of the tailgating vehicle has completed.

When completion of passing of the tailgating vehicle is grasped by the other vehicle grasping unit 72 (S312: YES), the lane change control unit 79 and the control implementation unit 64 performs S301 to S309 again to move the subject vehicle Am to the initial lane Ln1 (for example, the left traveling lane). When the return to the initial lane Ln1 has completed (S310: YES), the lane change control unit 79 completes a series of the automatic lane changes for the avoidance of the tailgating vehicle (S311).

As described up to this point, when a driver is not obligated to monitor the surroundings, a wider execution interval DLC is ensured from the first start point P1*s* at which the first automatic lane change is made to the second start point P2*s* at which the second lane change is made than when a driver is obligated to monitor the surroundings. When a plurality of times of planned automatic lane change are performed at intervals, such an occupant as a driver is less prone to recognize that an automatic lane change is continuously repeated; therefore, the occupant can determine that the automatic lane change has been made under normal control. According to the foregoing, an occupant's anxiety can be suppressed even when a plurality of times of automatic lane change are made.

In the third embodiment, in addition, as in the first embodiment, the condition of a road on which the subject vehicle Am travels is grasped by the road information grasping unit 73. The lane change control unit 79 determines at least either the first start point P1*s* or the second start point P2*s* according to the condition of the road. According to the foregoing, the lane change control unit 79 can set an execution section of automatic lane change in a road section where execution of automatic lane change is less difficult. As a result, a smooth automatic lane change can be easily made and thus an occupant's anxiety resulting from execution of automatic lane change can be suppressed.

In the third embodiment, as in the first embodiment, in lane change planning processing (Refer to FIG. 5), a merging section, a traffic jam section, a regulated section, and the like present in a traveling direction of the subject vehicle Am are grasped as avoidance sections (Refer to S122). The lane change control unit 79 so sets the first start point P1*s* and the second start point P2*s* as to avoid these avoidance sections (Refer to S123). As the result of the foregoing, an automatic lane change in an eyes-off state is made in an environment in which the automatic lane change is less prone to be hindered by other vehicles. Therefore, a situation in which an occupant's anxiety is caused by waiting for or canceling an automatic lane change can be avoided with high certainty.

In the third embodiment, a vehicle behind running behind the subject vehicle Am is at least grasped by the other vehicle grasping unit 72. When the distance between the subject vehicle Am and the vehicle behind is shorter than a predetermined value, the lane change control unit 79 plans execution of an automatic lane change from the initial lane Ln1 along which the subject vehicle is traveling to an adjacent lane. According to the foregoing, the lane change control unit 79 can automatically evacuate the subject vehicle Am from ahead of a vehicle behind that is highly probably tailgating. As a result, the subject vehicle Am can be guarded from a risk of a tailgating vehicle.

In the third embodiment, when after evacuation to the adjacent lane, passing of the vehicle behind by the subject vehicle Am is grasped by the other vehicle grasping unit 72, the lane change control unit 79 plans execution of an automatic lane change to return to the initial lane Ln1. As the result of the foregoing, when a risk of a tailgating vehicle is eliminated, the subject vehicle Am automatically returns to the traveling state before the occurrence of the tailgating vehicle. According to the foregoing, the convenience of automatic driving can be further enhanced.

In the third embodiment, the first start point P1*s* is equivalent to "first point"; the second start point P2*s* is equivalent to "second point"; and the execution interval DLC is equivalent to "interval." The road information grasping unit 73 is equivalent to "road condition grasping unit" and the automatic driving ECU 50*b* is equivalent to "automatic driving control device."

Fourth Embodiment

The fourth embodiment of the present disclosure is further another modification to the first embodiment. In the automatic driving ECU 50*b* shown in FIG. 2 and FIG. 7, when a traffic jam in the vicinity of the subject vehicle Am is grasped by the environment recognition unit 62, the lane change control unit 79 immediately gives up execution of continuous LC. That is, even in cases where a plurality of times of continuous automatic lane change are planned, when the vicinity of the subject vehicle is congested, the lane change control unit 79 does not bring the automatic lane change into a standby state (Refer to S132 in FIG. 6) but cancels the automatic lane change and terminates the lane change execution processing.

In addition, when a plurality of times of lane change are planned within a predetermined section or within a predetermined time and the vicinity of the subject vehicle is not congested, the automatic driving ECU 50*b* makes a driving operation request to a driver in cooperation with the HCU 100. In the fourth embodiment, when the subject vehicle Am is traveling on a highway, a driver is requested to input trigger operation instructing start of automatic lane change. The trigger operation is defined as operation input to, for example, a turn signal switch, a steer switch, or the like. Meanwhile, when the subject vehicle is traveling on an ordinary road, automatic lane change is not made. In this case, driving operation related to lane change is all requested of a driver. That is, driving change from the automatic driving system 50 to the driver is made.

Figure 23:
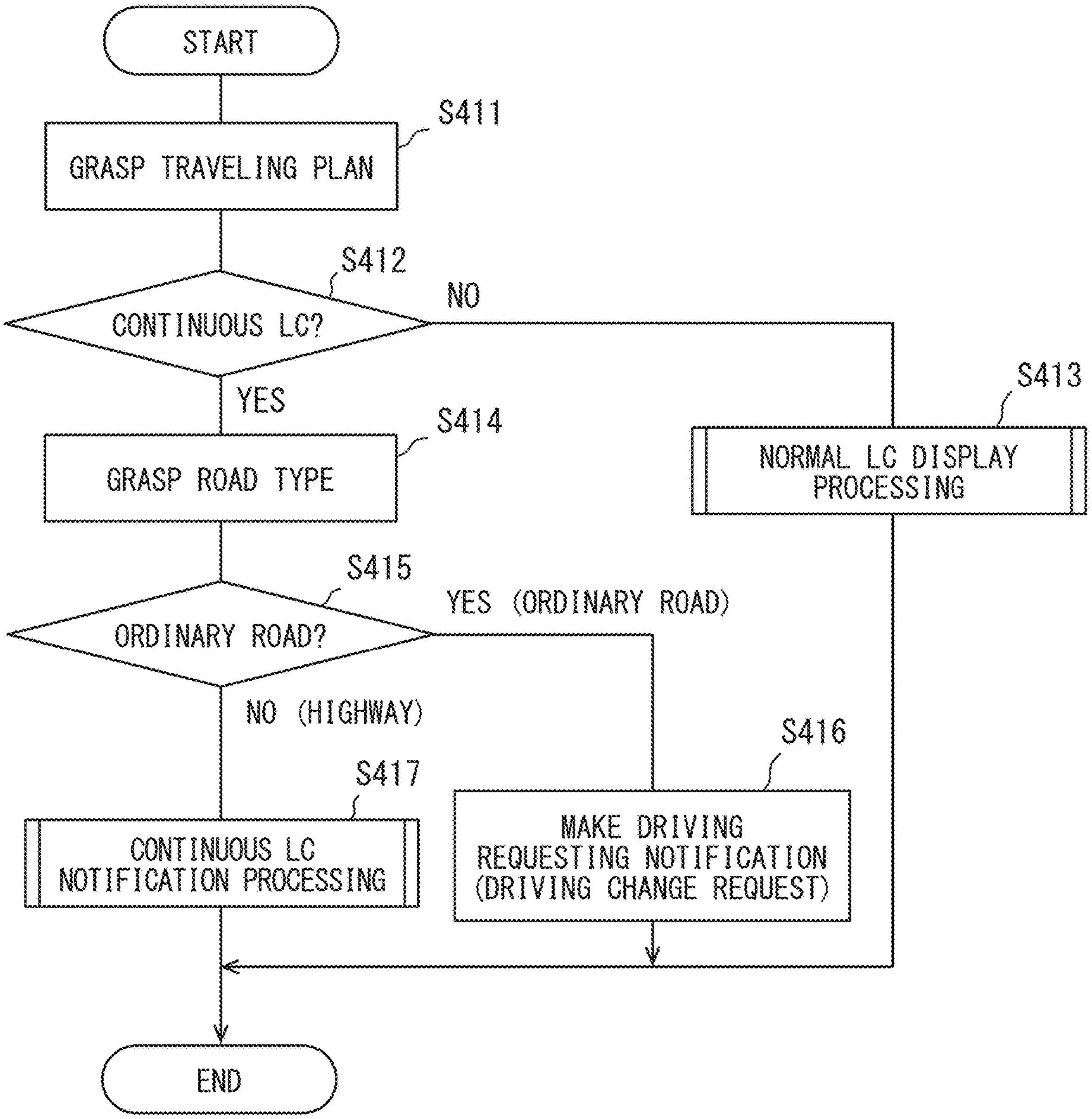
FIG. 23 is a flowchart illustrating the details of notification control processing performed at a HCU according to a fourth embodiment.

When a lane change is planned at the automatic driving ECU 50*b*, the HCU 100 performs notification control processing (Refer to FIG. 23) to request a driver to do a driving behavior. The driving behavior also includes such a behavior as surroundings monitoring and the like in addition to such driving operation as acceleration and deceleration operation, steering operation, and the like. Like the display control processing (Refer to FIG. 16) in the first embodiment, the notification control processing is started by the information linkage unit 82, the presentation control unit 88, and the like before the first start time t1*s* (Refer to FIG. 3 and FIG. 7) on the basis of approach to the first start point P1*s*.

The information linkage unit 82 grasps a traveling plane (planned traveling line) generated at the behavior determination unit 63 of the automatic driving ECU 50*b* (S411). The information linkage unit 82 refers to the grasped traveling plan and determines whether continuous LC is planned (S412). When only one time of lane change is planned in the traveling plan (S412: NO), the presentation control unit 88 performs display processing (hereafter, referred to as normal LC display processing) guiding normal (only one time) automatic lane change (S413). In the normal LC display processing, substantially the same processing as S13, S16 to S22, S27, S28 (Refer to FIG. 16) in the first embodiment is performed.

Meanwhile, when continuous LC is planned (S412: YES), the information linkage unit 82 acquires road type information indicating a type of a road on which the subject vehicle Am is traveling (S414). The road type information is, for example, generated by the road information grasping unit 73 and provided to the information linkage unit 82. Based on the road type information, the information linkage unit 82 determines whether the road on which the subject vehicle Am is traveling is an ordinary road or a highway (S415). For example, a national expressway, a motor highway, and the like where entry of a pedestrian, a cyclist, and the like is prohibited are defined as highway.

When the road on which the subject vehicle Am is traveling is an ordinary road (S415: YES), the presentation control unit 88 makes driving requesting notification requesting a driver to perform a driving behavior (S416). In the driving requesting notification in this case, a driver is requested to make a lane change by manual operation. That is, the driving requesting notification is equivalent to take-over request to a driver and a driver is requested to perform all the driving behaviors including surroundings monitoring, acceleration and deceleration operation, steering operation, and the like. The presentation control unit 88 makes driving requesting notification as a driving change request by reproducing a voice message by the audio device 24 in addition to display by the meter display 21 and the HUD 23. After the execution of the driving requesting notification, the notification control processing is terminated. The driver takes over driving operation from the automatic driving system 50 and makes a plurality of times of lane change in accordance with guidance by the CID 22 by manual operation.

Figure 24:
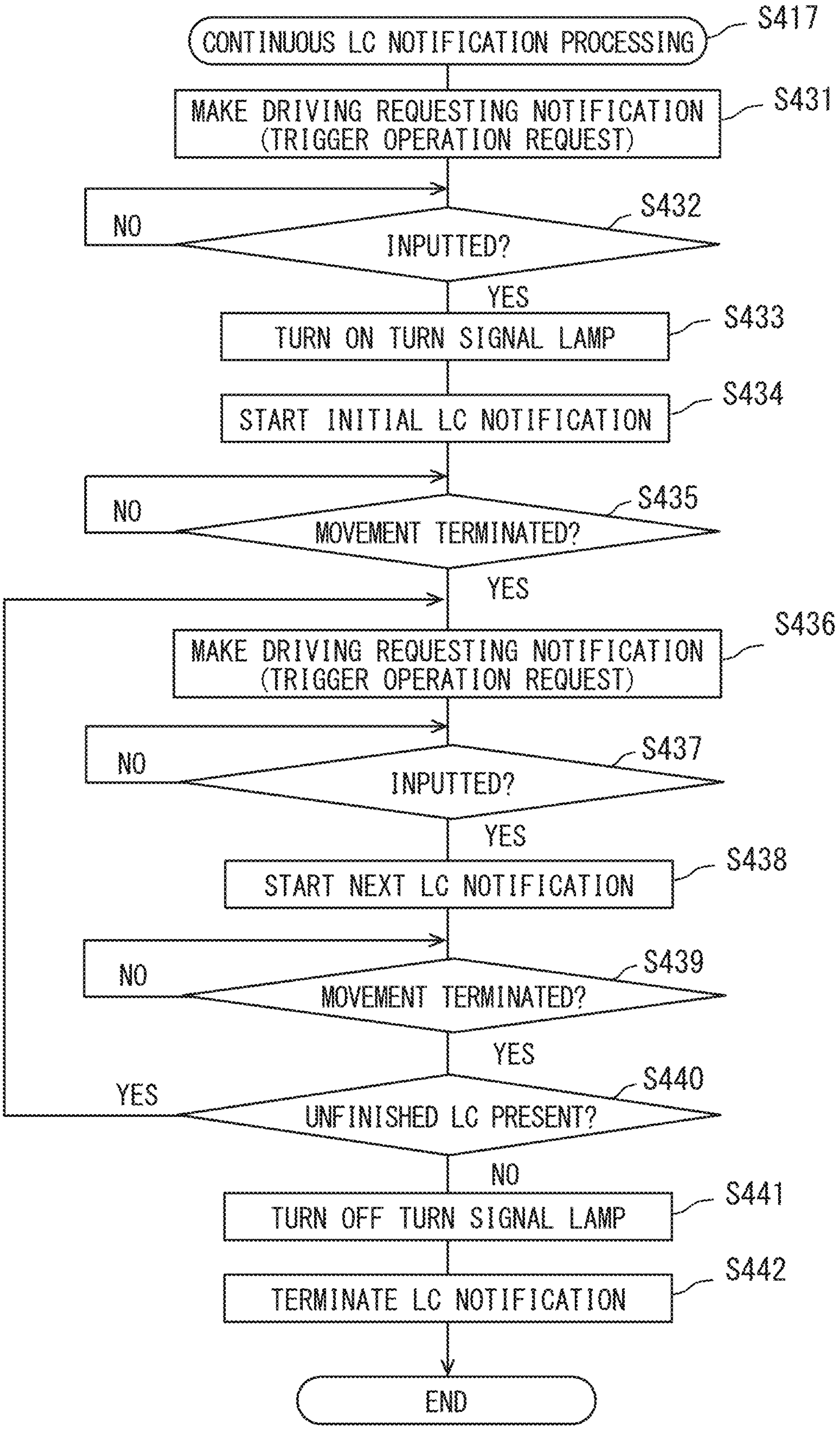
FIG. 24 is a flowchart illustrating the details of continuous LC notification processing performed as sub-processing of notification control processing.

Meanwhile, when the road on which the subject vehicle Am is traveling is a highway (S415: NO), the presentation control unit 88 performs continuous LC notification processing which is sub-processing of the notification control processing (S417). In the continuous LC notification processing (Refer to FIG. 24), the driver is requested to determine time to start the initial automatic lane change (S431). Specifically, the presentation control unit 88 requests the driver to restart surroundings monitoring and input trigger operation by driving requesting notification using display of the meter display 21 or the HUD 23. The presentation control unit 88 may reproduce a voice message by the audio device 24 to request the driver to restart surroundings monitoring and input trigger operation.

The presentation control unit 88 determines whether trigger operation has been inputted in cooperation with the information acquisition unit 81 or the request processing unit 84 (S432). The presentation control unit 88 waits for input of trigger operation (S432: NO) and, when a timeout occurs without input of trigger operation, makes cancel notification for continuous LC. In this case, the continuous LC notification processing as sub-processing and the notification control processing as main processing are terminated.

Meanwhile, when input of trigger operation based on the driving requesting notification is grasped (S432: YES), the request processing unit 84 starts flashing of the turn signal lamp 44 corresponding to the movement direction of the subject vehicle Am in the automatic lane change by outputting a request toward the body ECU 43 (S433). Further, the presentation control unit 88 alters the display of the subject vehicle status StA (Refer to FIG. 18) to a mode for notification of the first (initial) automatic lane change (S434). In this case, the automatic lane change requires surroundings monitoring by the driver. Therefore, the subject vehicle status StA displays a monitoring requesting icon requesting continuation of surroundings monitoring in place of the monitoring recommending icon IcM (Refer to FIG. 18).

The information linkage unit 82 determines whether the first lane-to-lane movement has competed (S435). When the automatic lane change is canceled at the automatic driving ECU 50*b* before completion of the lane-to-lane movement, the continuous LC notification processing and the notification control processing are terminated. Meanwhile, when termination of the lane-to-lane movement is grasped at the information linkage unit 82 (S435: YES), the presentation control unit 88 requests the driver to determine time to start the next automatic lane change by making driving requesting notification again (S436).

The presentation control unit 88 determines again whether trigger operation has been inputted (S437). When input of trigger operation based on the driving requesting notification is grasped (S437: YES), the presentation control unit 88 alters the display of the subject vehicle status StA (Refer to FIG. 10) to a mode for notification of the next (second or later) automatic lane change (S438).

The information linkage unit 82 determines whether the second or later lane change has terminated (S439). When the termination of the lane-to-lane movement is grasped (S439: YES), the information linkage unit 82 further gasps the presence/absence of an automatic lane change that has not been made (S440). When the third or later continuous lane change is planned, the information linkage unit 82 determines that an automatic lane change that has not been made is present (S440: YES) and requests again the driver to determine time to start an automatic lane change (S436). Meanwhile, when the third or later continuous lane change is not planned, the information linkage unit 82 determines that an automatic lane change that has not been made is not present (S440: NO). In this case, flashing of the turn signal lamp 44 is terminated (S441) and further the notification of the automatic lane change is also terminated (S442).

In the fourth embodiment described up to this point, when a traveling plan to make a plurality of times of lane change within a predetermined section or within a predetermined time is grasped, a driver is requested to perform a driving behavior by driving requesting notification. Therefore, owing to the recognition of the driving requesting notification, the driver can judge that processing under normal control is performed at the automatic driving ECU 50*b* of the subject vehicle Am. As a result, also, in the fourth embodiment, the same effect as in the first embodiment is brought about and even when a plurality of times of automatic lane change are made, anxiety of such an occupant as a driver can be suppressed.

In the fourth embodiment, in addition, driving requesting notification requesting a driver to make a lane change by manual operation and driving requesting notification requesting a driver to determine time to start automatic lane change performed by autonomous travel control are switched and performed. Therefore, driving operation that cannot be handled by the system side is appropriately taken over to a driver according to the travel environment of the vicinity of the subject vehicle, the performance of the automatic driving ECU 50*b* and surroundings monitoring sensor 30 of the subject vehicle Am, and the like. As a result, a plurality of times of required lane change can be stably made by cooperation between the driver and the automatic driving system 50.

In the fourth embodiment, when a plurality of times of lane change are planned while the subject vehicle Am is traveling on an ordinary road, driving requesting notification is made to request a driver to make the lane changes by manual operation. Meanwhile, when a plurality of times of lane change are planned while the subject vehicle is traveling on a highway, driving requesting notification is made to request a driver to determine time to start the lane changes. According to the foregoing, on a highway where a risk of automatic lane change is lower than on an ordinary road, it can be avoided to take over all the driving operations to a driver. Therefore, while anxiety of such an occupant as a driver can be suppressed, the convenience of an automatic driving function on a highway can be enhanced.

In the fourth embodiment, when the vicinity of the subject vehicle is congested, continuous LC by autonomous travel control is not brought into a standby state but is immediately canceled. Therefore, when congestion in the vicinity of the subject vehicle Am is grasped, the above-mentioned driving requesting notification related to a plurality of times of lane change is not made. According to the foregoing, a situation in which a driver is requested to perform a driving behavior in a traveling condition high in driving load can be avoided.

Fifth Embodiment

The fifth embodiment of the present disclosure is a modification to the fourth embodiment. When a traveling plan containing continuous LC is generated, the automatic driving ECU 50*b* (Refer to FIG. 2 and FIG. 3) in the fifth embodiment makes the first lane-to-lane movement by automatic lane change. When the second or later automatic lane change is attempted but this automatic lane change is brought into a standby state, the automatic driving ECU 50*b* requests a driver to continue the lane change in cooperation with the HCU 100.

Figure 25:
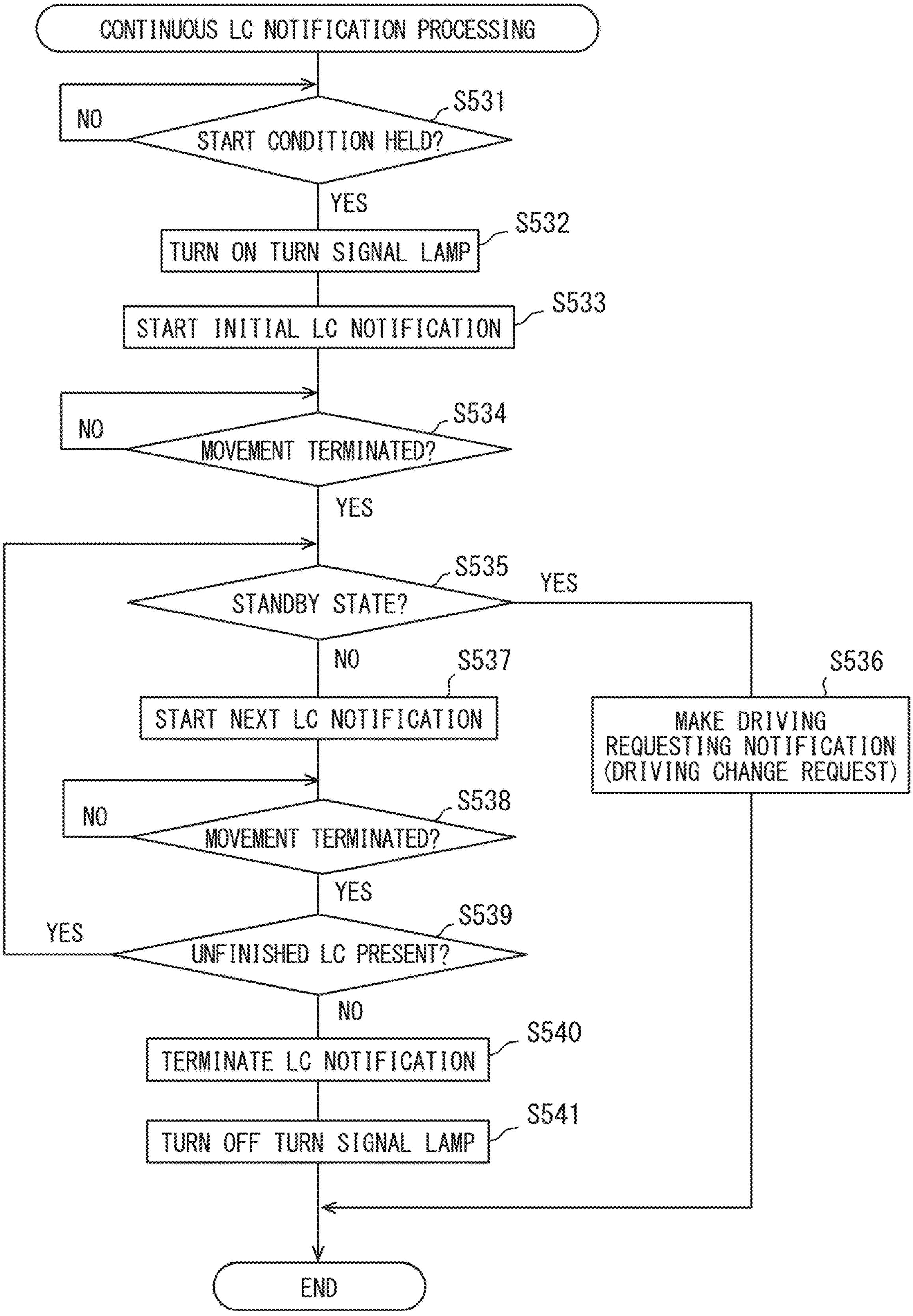
FIG. 25 is a flowchart illustrating the details of continuous LC notification processing as sub-processing of notification control processing according to a fifth embodiment.

In notification control processing (Refer to FIG. 23) in the above-mentioned fifth embodiment, when continuous LC is planned (S412: YES), the continuous LC notification processing shown in FIG. 25 is performed as sub-processing in place of the processing of S414 to S417. In the continuous LC notification processing, the presentation control unit 88 determines whether a start condition for notification of automatic lane change has held (S531). As in the first embodiment (Refer to S16 in FIG. 16), when the subject vehicle Am arrives at the first start point P1*s*, the presentation control unit 88 determines that a start condition has held (S531: YES). In this case, the request processing unit 84 starts flashing of the turn signal lamp 44 corresponding to a movement direction of the subject vehicle Am in the automatic lane change by outputting a request toward the body ECU 43 (S532). Further, the presentation control unit 88 alters the display of the subject vehicle status StA (Refer to FIG. 18) to a mode for notification of the first (initial) automatic lane change (S533).

The information linkage unit 82 determines whether the first lane-to-lane movement by automatic lane change has terminated (S534). When the termination of the first lane-to-lane movement is grasped (S534: YES), the information linkage unit 82 determines whether the second automatic lane change is in a standby state (S535). When the automatic lane change is in a standby state, (S535: YES), the presentation control unit 88 makes driving requesting notification to request the driver to make the lane change by manual operation (S536). The driving requesting notification in this case is notification requesting a driver to make a driving change.

Meanwhile, when the automatic lane change is not brought into a standby state but is immediately started (S535: NO), the presentation control unit 88 alters the display of the subject vehicle status StA (Refer to FIG. 10) to a mode for notification of the next (second or later) automatic lane change (S537).

The information linkage unit 82 determines whether the second or later lane-to-lane movement has terminated (S538). When the termination of the lane-to-lane movement is grasped (S538: YES), the information linkage unit 82 further grasps the presence/absence of an automatic lane change that has not been made (S539). When the third or later continuous lane change is planned, the information linkage unit 82 determines that an automatic lane change that has not been made is present (S539: YES), the information linkage unit 82 determines whether the next automatic lane change is in a standby state (S535). When the next automatic lane change is in a standby state (S535: YES), the driver is requested to make the lane change by manual operation by driving requesting notification (S536).

Meanwhile, when the third or later continuous lane change is not planned, the information linkage unit 82 determines that an automatic lane change that has not been made is not present (S539: NO). In this case, flashing of the turn signal lamp 44 is terminated (S540) and further the notification of the automatic lane change is terminated (S541).

Also, in the fifth embodiment described up to this point, the same effect as in the fourth embodiment is brought about and even when a plurality of times of automatic lane change are made, anxiety of such an occupant as a driver can be suppressed. In addition, in the fifth embodiment, when the second or later lane change started by autonomous travel control is brought into a standby state, a driver is requested to make the lane change by manual operation by driving requesting notification. Therefore, when a driver appropriately copes with driving requesting notification, even continuous LC high in difficulty can be accomplished by cooperation between the system and the driver.

Sixth Embodiment

The sixth embodiment of the present disclosure is a modification to the fifth embodiment. When a traveling plan containing continuous LC is generated, the automatic driving ECU **50*b* (Refer to FIG. 2 and FIG. 3) in the fifth embodiment makes only the first lane-to-lane movement by automatic lane change. Meanwhile, the second or later lane change is requested of a driver. In continuous LC notification processing (Refer to FIG. 25) in such a modification, S535 and S537 to S541, including determination of whether the second automatic lane change is in a standby state and the like, are omitted. In notification of the initial automatic lane change (Refer to S533), the presentation control unit 88 makes advance notification indicating that the second automatic lane change is planned to be requested. When the termination of the first lane-to-lane movement is grasped (S534: YES), the presentation control unit 88 requests a driver to make the second lane change by manual operation by driving requesting notification (S536**). As the result of the foregoing, the driver makes the second and later lane change by manual operation in accordance with the driving requesting notification.

In the sixth embodiment described up to this point, the initial lane change is made by autonomous travel control and execution of the second and later lane change by manual operation is requested of a driver by driving requesting notification. According to the foregoing, the same effect as in the fifth embodiment is brought about and even continuous LC high in difficulty can be accomplished by cooperation between the system and the driver.

Seventh Embodiment

The seventh embodiment of the present disclosure is further another modification to the first embodiment. The automatic driving ECU **50*b* (Refer to FIG. 2 and FIG. 3**) in the seventh embodiment changes whether to make driving behavior request to a driver between when a plurality of times of automatic lane change are made within a predetermined section or within a predetermined time and when a plurality of times of automatic lane change are continuously made. In the following description, a plurality of times of automatic lane change made within a predetermined section or within a predetermined time will be referred to as "normal continuous LC" and a plurality of times of automatic lane change continuously made will be referred to as "special continuous LC."

In the lane change control unit 79, a predetermined section (several kilometers or so) in the first embodiment is defined as first predetermined section and a second predetermined section shorter than the first predetermined section is further defined. Similarly, in the lane change control unit 79, a predetermined time (several minutes or so) in the first embodiment is defined as first predetermined time and a second predetermined time shorter than the first predetermined time is further defined. Cases where a plurality of times of automatic lane change are made within a section shorter than the first predetermined section and longer than the second predetermined section or within a time shorter than the first predetermined time and longer than the second predetermined time are taken as the above-mentioned normal continuous LC.

Meanwhile, cases where a plurality of times of lane change are made within the second predetermined section or within the second predetermined time are taken as the above-mentioned special continuous LC. In the special continuous LC, a distance or a time from the end point of the first section SCS1 to the start point of the second section LCS 2 is minimal (Refer to FIG. 7). For example, 100 meters or so are taken as a distance from the end point of the first section LCS1 to the start point of the second section LCS2 and several seconds or so are taken as a distance from the end point of the first section LCS1 to the start point of the second section LCS 2. Cases where a distance or a time from the end point of the first section LCS1 to the start point of the second section LCS2 is zero may also be included in the special continuous LC.

Figure 26:
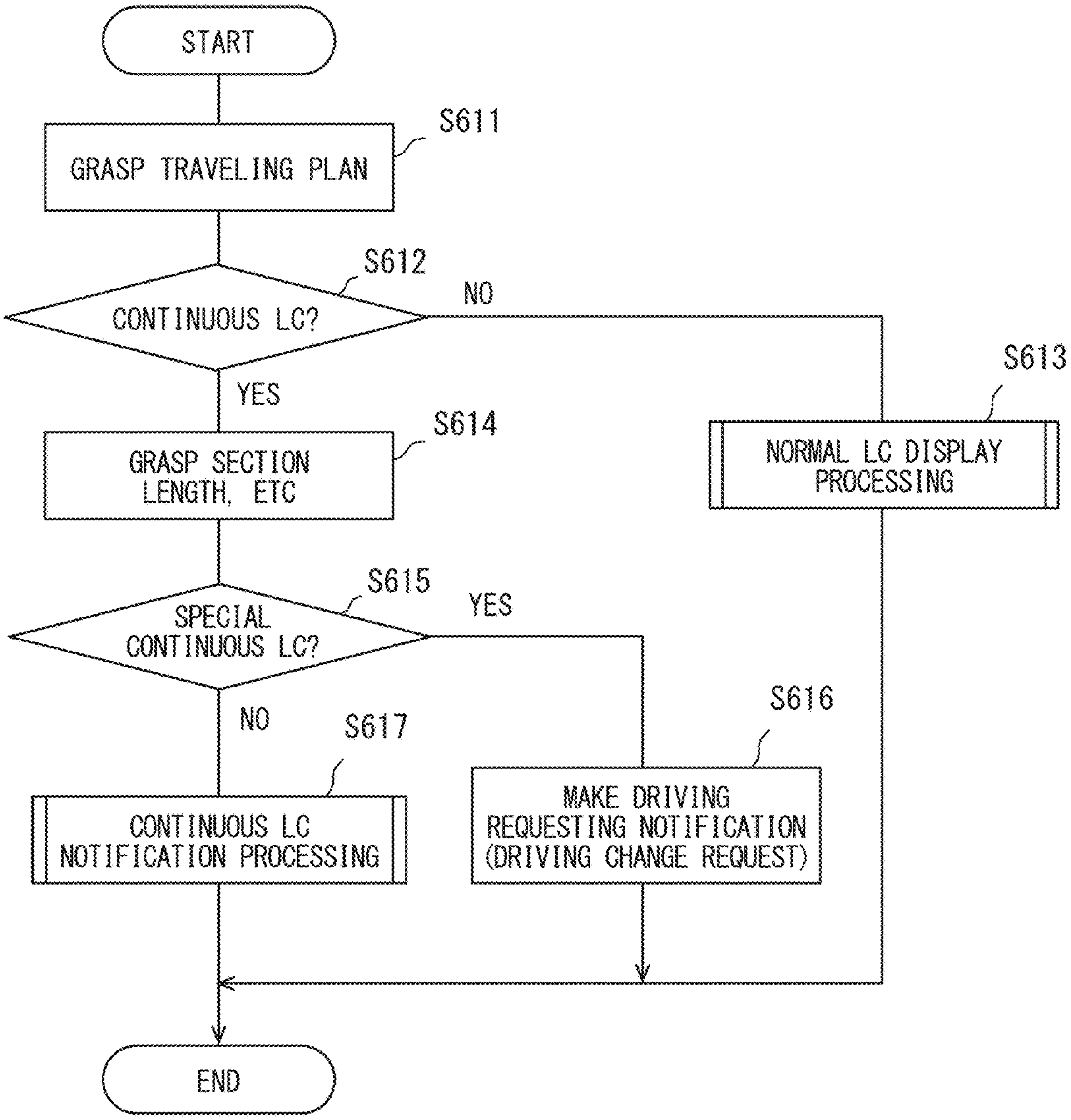
FIG. 26 is a flowchart illustrating the details of notification control processing performed at a HCU according to a seventh embodiment.

When a lane change is planned at the automatic driving ECU **50*b*, the HCU 100 performs notification control processing (Refer to FIG. 26). As in the fourth embodiment (Refer to FIG. 23), the notification control processing is started by the information linkage unit 82, the presentation control unit 88, and the like before the first start time t1***s* on the basis of approach to the first start point P1*s* (Refer to FIG. 3 and FIG. 7).

The information linkage unit 82 grasps a traveling plan generated at the behavior determination unit 63 of the automatic driving ECU 50*b* (S611). The information linkage unit 82 refers to the grasped traveling plan and determines whether continuous LC is planned (S612). When the lane change planned in the traveling plan is only once (S612: NO), the presentation control unit 88 performs normal LC display processing guiding normal (only one time) automatic lane change (S613). The details of this normal LC display processing are substantially the same as those in the fourth embodiment (Refer to S413 in FIG. 23).

Meanwhile, when continuous LC is planned (S612: YES), the information linkage unit 82 grasps an execution section length or an execution time of the planned continuous LC (S614). Based on the grasped execution section length or execution time, the information linkage unit 82 determines whether the continuous LC planned at the automatic driving ECU 50*b* is special continuous LC (S615).

When the planned continuous LC is special continuous LC (S615: YES), the presentation control unit 88 makes driving requesting notification to request the driver to perform a driving behavior (S616). In the driving requesting notification in this case, a driver is requested to perform all the driving operations including acceleration and deceleration operation, steering operation, and the like in addition to surroundings monitoring. That is, the driving requesting notification is a driving change request requesting a driver to make a lane change by manual operation.

Meanwhile, when the planned continuous LC is normal continuous LC (S615: NO), the presentation control unit 88 performs continuous LC notification processing (S617). In the continuous LC notification processing, substantially the same processing as that of S16 to S28 (Refer to FIG. 16) in the first embodiment is performed. In this continuous LC notification processing, execution of driving requesting notification related to acceleration and deceleration operation and steering operation is restricted. That is, driving requesting notification to be a driving change request is not made.

Also, in the seventh embodiment described up to this point, the same effect as in the first embodiment is brought about and even when a plurality of times of automatic lane change are made, anxiety of such an occupant as a driver can be suppressed. In the seventh embodiment, in addition, in the case of special continuous LC in which a plurality of times of automatic lane change are planned within a second predetermined section shorter than a first predetermined section or within a second predetermined time shorter than a first predetermined time, the presentation control unit 88 makes driving requesting notification to request a driver to perform a driving behavior. Therefore, even continuous LC high in difficulty for the automatic driving ECU 50*b* can be smoothly made by driving change to a driver.

In the seventh embodiment, in the case of special continuous LC in which a plurality of times of automatic lane change are planned within a second predetermined section or within a second time, the presentation control unit 88 makes driving requesting notification to request a driver to perform acceleration and deceleration operation and steering operation as driving behaviors. Meanwhile, in the case of normal continuous LC in which a plurality of times of automatic lane change are planned within a section shorter than a first predetermined section and longer than a second predetermined section or within a time shorter than a first predetermined time and longer than a second predetermined time, execution of driving requesting notification related to acceleration and deceleration operation and steering operation is restricted. Therefore, continuous LC that can be made by the automatic driving ECU 50*b* can be accomplished by the automatic driving ECU 50*b* without acceleration and deceleration operation or steering operation being taken over to a driver. According to the foregoing, even though the performance of the automatic driving ECU 50*b* is limited, degradation in the convenience of the automatic driving function can be suppressed.

Eighth Embodiment

The eighth embodiment of the present disclosure is a modification to the seventh embodiment. When special continuous LC is planned in notification control processing (Refer to FIG. 26) in the eighth embodiment (S615: YES), the presentation control unit 88 makes driving requesting notification to request a driver to perform surroundings monitoring as a driving behavior (S616). Meanwhile, when normal continuous LC is planned (S615: NO), in continuous LC notification processing (S617) as sub-processing, the presentation control unit 88 restricts execution of driving requesting notification related to surroundings monitoring. That is, driving requesting notification requesting a driver to perform surroundings monitoring is not made in the continuous LC notification processing.

In the eighth embodiment described up to this point, in the case of special continuous LC in which a plurality of times of automatic lane change are planned within a second predetermined section or within a second predetermined time, the presentation control unit 88 makes driving requesting notification to request a driver to perform surroundings monitoring as a driving behavior. Therefore, when the automatic driving ECU 50*b* becomes incapable of continuing driving operation, a driving change from the system to the driver can be smoothly made.

In addition, in the eighth embodiment, in the case of normal continuous LC in which a plurality of times of automatic lane change are planned within a section shorter than a first predetermined section and longer than a second predetermined section or within a time shorter than a first predetermined time and longer than a second predetermined time, execution of driving requesting notification related to surroundings monitoring is restricted. In the case of normal continuous LC, therefore, the automatic driving ECU 50*b* can accomplish a plurality of times of automatic lane change without hindering a driver's second task. Therefore, even though the performance of the automatic driving ECU 50*b* is limited, degradation in the convenience of the automatic driving function can be suppressed.

Ninth Embodiment

The ninth embodiment of the present disclosure is further another modification to the first embodiment. The automatic driving ECU 50*b* (Refer to FIG. 2 and FIG. 3) in the ninth embodiment switches between control in which a lane change is repeated one lane by one lane (normal continuous LC control) and control in which a lane change is collectively made for several lanes (integrated continuous LC control) according to a travel environment. In the normal continuous LC control, a section (time) within which traveling is performed along a lane is ensured between the end point of a first section LCS1 and the start point of a second section LCS2 (Refer to FIG. 7). Meanwhile, in the integrated continuous LC control, a first section LCS1 and a second section LCS2 continues to each other and a section (time) within which traveling is performed along a lane is not ensured.

The lane change control unit 79 (Refer to FIG. 2) determines whether to permit integrated continuous LC control according to the situation of the presence of other vehicles in the vicinity of the subject vehicle grasped at the other vehicle grasping unit 72, the environment of a road on which the subject vehicle is traveling grasped at the road information grasping unit 73, and the like. Specifically, when any other vehicle is recognized within a predetermined range around the subject vehicle Am at the other vehicle grasping unit 72, the lane change control unit 79 determines to exercise normal continuous LC control. Meanwhile, when any other vehicle is not recognized within the predetermined range around the subject vehicle, the lane change control unit 79 determines to exercise integrated continuous LC control.

Further, when the road on which the subject vehicle Am is traveling is an ordinary road, the lane change control unit 79 determines to exercise normal continuous LC control. Meanwhile, when the road on which the subject vehicle Am is traveling is a highway, the lane change control unit 79 determines to exercise integrated continuous LC control. When the subject vehicle Am is traveling in a curved section, the vicinity of an intersection, or the like, the lane change control unit 79 determines to exercise normal continuous LC control. Meanwhile, when the subject vehicle is not traveling in a curved section, the vicinity of an intersection or the like, or the like, the lane change control unit 79 determines to exercise integrated continuous LC control.

The lane change control unit 79 may determine whether to permit integrated continuous LC control based on a combination of a plurality of the above-mentioned conditions. For example, when the subject vehicle Am travels on an ordinary road or in a curved section or when any other vehicle is present in the vicinity of the subject vehicle, the lane change control unit 79 does not permit execution of integrated continuous LC but determines to exercise normal continuous LC control. Meanwhile, when the subject vehicle Am is traveling in a straight section of a highway and further any other vehicle is not present in the vicinity of the subject vehicle, the lane change control unit 79 determines to exercise integrated continuous LC.

When a plurality of times of automatic lane change are planned at the automatic driving ECU 50*b*, the HCU 100 notifies of a mode of movement control in the continuous LC. That is, either normal continuous LC control or integrated continuous LC control planned to be exercised is notified to a driver. A mode of movement control in continuous LC is started at a point or time at which the first automatic lane change becomes feasible.

Specifically, when the subject vehicle Am is traveling on an ordinary road, in a curved section or the vicinity of an intersection, or the like and the lane change control unit 79 exercises normal continuous LC control, the presentation control unit 88 notifies of execution of normal continuous LC control. When any other vehicle is present in the vicinity of the subject vehicle and the lane change control unit 79 exercises normal continuous LC control, the presentation control unit 88 notifies of execution of normal continuous LC control.

The presentation control unit 88 notifies of execution of normal continuous LC control by displaying the subject vehicle status StA including a first path IP1 extended from the initial lane Ln1 to an intermediate lane Ln2 and a second path IP2A extended from the intermediate lane Ln2 to an arrival lane Ln3 (Refer to FIG. 21). In this case, the presentation control unit 88 makes driving requesting notification requesting a driver to perform surroundings monitoring or monitoring recommending notification (display of the monitoring recommending icon IcM) prompting a driver to monitor the surroundings together with notification of a mode of movement control.

Figure 27:
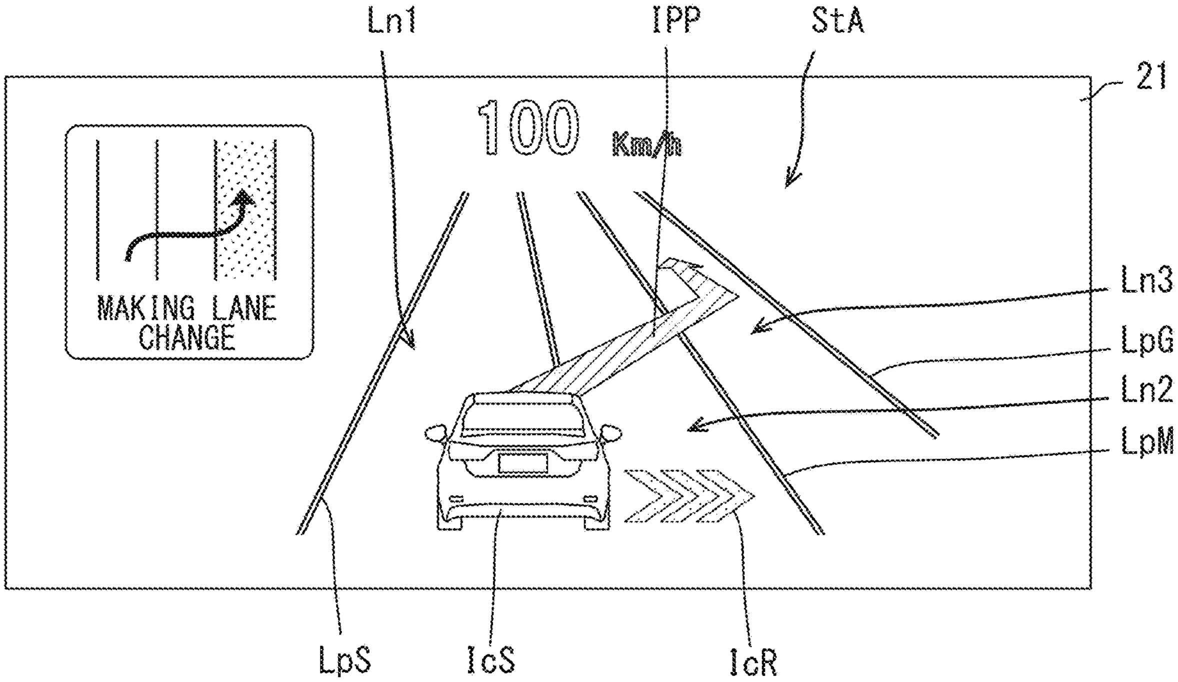
FIG. 27 is a drawing illustrating an example of continuous LC display notifying of execution of integral continuous LC control according to a ninth embodiment.

Meanwhile, when the subject vehicle Am is traveling on a highway or in a straight section and the lane change control unit 79 exercises integrated continuous LC control, the presentation control unit 88 notifies of execution of integrated continuous LC. Similarly, when any other vehicle is not present in the vicinity of the subject vehicle and the lane change control unit 79 exercises integrated continuous LC control, the presentation control unit 88 notifies of execution of integrated continuous LC. The presentation control unit 88 notifies of integrated continuous LC control by displaying the subject vehicle status StA including an arrow-shaped planned path IPP that traverses an intermediate lane Ln2 and is further extended from the initial lane Ln1 to an arrival lane Ln3 (Refer to FIG. 27). In this case, the presentation control unit 88 may not make notification of a request to monitor the surroundings, a recommendation of execution of monitoring the surroundings, or the like.

Also, in the ninth embodiment described up to this point, the same effect as in the first embodiment is brought about and even when a plurality of times of automatic lane change are made, anxiety of such an occupant as a driver can be suppressed. In the ninth embodiment, in addition, when a plurality of times of automatic lane change are planned within a predetermined section or within a predetermined time, whether normal continuous LC control is exercised or integrated continuous LC control is exercised is determined according to a travel environment in which the subject vehicle Am travels. Therefore, in a travel environment in which continuous LC is low in difficulty, the automatic driving ECU 50*b* can accomplish a plurality of times of lane change in a short time by integrated continuous LC control. According to the foregoing, the convenience of the automatic driving function can be further enhanced.

In the ninth embodiment, when a plurality of times of lane change are planned, the presentation control unit 88 notifies a driver of a mode of movement control before start of lateral movement in the continuous LC. Therefore, the driver can grasp in advance a behavior of the subject vehicle Am in continuous LC, specifically, whether lateral movement of the subject vehicle Am is once interrupted in an intermediate lane Ln2. As a result, even when a plurality of times of lane change are made, anxiety of such an occupant as a driver can be further suppressed.

In the ninth embodiment, when the subject vehicle Am is traveling on an ordinary road, the presentation control unit 88 notifies of execution of normal continuous LC control. When the subject vehicle Am is traveling on a highway, the presentation control unit 88 notifies of execution of integrated continuous LC control. As mentioned above, a mode of movement control in continuous LC is changed according to a type of a road and the mode is notified of; as a result, even when a plurality of times of lane change are made, such an occupant as a driver is less prone to feel anxiety.

In the ninth embodiment, in addition, when any other vehicle is recognized in the vicinity of the subject vehicle Am, the presentation control unit 88 notifies of execution of normal continuous LC control. When any other vehicle is not recognized, the presentation control unit 88 notifies of execution of integrated continuous LC control. As mentioned above, a mode of movement control in continuous LC is changed depending on the presence/absence of any other vehicle in the vicinity of the subject vehicle and the mode is notified of; as a result, even when a plurality of times of lane change are made, such an occupant as a driver is less prone to feel anxiety.

In the ninth embodiment, the normal continuous LC control is equivalent to "movement control in first mode" and the integrated continuous LC control is equivalent to "movement control in second mode."

Other Embodiments

Up to this point, a description has been given to a plurality of embodiments but the present disclosure is not so interpreted as to be limited to the above-mentioned embodiments and is applicable to various embodiments and combinations thereof without departing from the subject matter of the present disclosure.

In the first embodiment, the continuous LC display that notifies of an execution plan of a plurality of times of lane change is started slightly before first start time t1*s* or at substantially the same time as the first start time t1*s*. The continuous LC display in the second embodiment is started at passage time t1*m*. However, time to start the continuous LC display may be appropriately varied as long as an execution plan of the second or later automatic lane change can be notified of between first start time t1*s* and first completion time t1*f*. That is, that an execution plan of a plurality of times of lane change is notified of in accordance with the first automatic lane change means that an execution plan of the second or later automatic lane change is notified of before first completion time t1*f*. For example, the continuous LC display in the first modification is started after first start time t1*s* before passage time t1*m*. The continuous LC display in the second modification is started after passage time t1*m* before first completion time t1*f*.

In the third modification to the above-mentioned embodiments, substantially the same continuous LC display is performed between when continuous LC is made on the basis of approach to an LC required point P3 and when continuous LC is made in conjunction with overtaking. That is, the processing of altering the subject vehicle status StA to the contents corresponding to a type of continuous LC is omitted in the third modification.

The continuous LC display in the fourth modification to the above-mentioned embodiments is displayed also by the CID 22. In the fourth modification, an execution plan of a plurality of times of automatic lane change can be notified to not only a driver but also an occupant. In the fifth modification to the above-mentioned embodiments, the continuous LC display is provided in a virtual image by the HUD 23. That is, the continuous LC display may be superimposed contents superimposed in the foreground. In the above-mentioned fourth and fifth modifications, the CID 22 and the HUD 23 are respectively equivalent to "display device."

Further, an execution plan of a plurality of times of lane change may be notified of by a voice message reproduced by the audio device 24. Similarly, monitoring recommending notification may also be made by a voice message reproduced by the audio device 24.

In the sixth modification to the above-mentioned embodiments, also when planned execution of automatic lane change is once, monitoring recommending notification is made. In the sixth modification, when planned execution of automatic lane change is once, execution is made in a weaker mode than when planned execution of automatic lane change is more than once. For example, when planned execution of automatic lane change is once, the monitoring recommending icon IcM is displayed in a smaller size than when planned execution of automatic lane change is more than once. Alternatively, while a notification sound is reproduced in conjunction with start of the display of the monitoring recommending icon IcM when planned execution of automatic lane change is more than once, reproduction of a notification sound is omitted and only the monitoring recommending icon IcM is displayed when planned execution of automatic lane change is once. As mentioned above, execution of monitoring recommending notification may be restricted in a different mode from when execution is not performed.

Control of on/off of the turn signal lamp 44 exercised by the request processing unit 84 of the HCU 100 in the above-mentioned embodiments may be exercised by the automatic driving ECU 50*b*. Even when a plurality of times of lane change are planned, flashing of the turn signal lamp 44 may be once terminated after termination of the first automatic lane change.

In the third embodiment, a section different from the merging section and the traffic jam section may be set as avoidance section. In the seventh modification to the third embodiment, an adjustment of setting a first section LCS1 and a second section LCS2 with an avoidance section excluded is omitted. When the automatic driving control at level 4 or higher is exercised at the automatic driving ECU 50*b*, a wider execution interval DLC is set than an execution interval DLC in driving assist control. An execution interval DLC in the automatic driving control at level 4 or higher may be substantially the same as an execution interval DLC in autonomous travel control at level 3 or may be narrower than an execution interval DLC in autonomous travel control at level 3.

In the eighth modification to the third embodiment, an automatic lane change for avoidance of a tailgating vehicle is made only once. That is, the lane change control unit 79 makes only an automatic lane change for evacuating from the initial lane Ln1 along which a tailgating vehicle is traveling to an adjacent lane and an automatic lane change for returning from the adjacent lane to the initial lane Ln1 is not made. Even in this eighth modification, the subject vehicle Am can be guarded from a risk of a tailgating vehicle.

In the ninth modification to the seventh embodiment, even in cases where execution of normal continuous LC is planned (S615 in FIG. 26: NO), driving requesting notification is made to request a driver to perform driving operation when any other vehicle is present within a predetermined range around the subject vehicle.

In the tenth modification to the eighth embodiment, even in cases where execution of normal continuous LC is planned, driving requesting notification is made to request a driver to monitor the surroundings when any other vehicle is present within a predetermined range around the subject vehicle. By such a mode as the ninth and tenth modifications mentioned above, execution of driving requesting notification may be restricted in a scene in which normal continuous LC is made.

In the eleventh modification to the above-mentioned embodiments, each function of the driving assist ECU 50*a* and the automatic driving ECU 50*b* is provided by a single automatic driving ECU. That is, the automatic driving ECU 50*b* in the eleventh modification is provided with the functions of the driving assist ECU 50*a*.

In the twelfth modification to the above-mentioned embodiments, each function of the driving assist ECU 50*a*, the automatic driving ECU 50*b*, and the HCU 100 is provided by a single integrated ECU. In this twelfth modification, the integrated ECU is equivalent to "presentation control device" and "automatic driving control device." Each function of the presentation control device and the automatic driving control device according to the present disclosure may be implemented by cooperation between the automatic driving ECU 50*b* and the HCU 100. In such an aspect, a system including the automatic driving ECU 50*b* and the HCU 100 is equivalent to "presentation control device" and "automatic driving control device."

In the above embodiments, functions provided by the automatic driving ECUs and the HCU can be provided by software and hardware for executing the software, only software, only hardware, or a complex combination of the hardware and the software. Further, when such functions are provided by electronic circuits as hardware, each function can be provided by a digital circuit including a large number of logic circuits, or an analog circuit.

Each processing unit in the above-described embodiments is hardware for arithmetic processing in cooperation with the RAM. The processing unit includes at least one arithmetic core such as a central processing unit (CPU) and a graphics processing unit (GPU). The processing unit may further include a field-programmable gate array (FPGA), a neural network processing unit (NPU), an IP core having another dedicated function, and the like. The processing unit according to the above-described embodiments may be individually mounted on a printed circuit board, or may be mounted on an application specific integrated circuit (ASIC), an FPGA, or the like.

The form of a storage medium (a non-transitory tangible computer readable medium) that stores various programs and the like may also be appropriately changed. Further, the storage medium is not limited to the configuration provided on the circuit board, and may be provided in the form of a memory card or the like, inserted into a slot portion, and electrically connected to a control circuit such as an automatic driving ECU or an HCU. In addition, the storage medium may be an optical disk, a hard disk drive, or the like serving as a copy base of the program to the automatic driving ECU or the HCU.

The vehicle on which the automatic driving system and the HMI system are mounted is not limited to a general private passenger vehicle, and may be a rental vehicle, a manned taxi vehicle, a ride-sharing vehicle, a cargo vehicle, a bus, or the like. The vehicle on which the automatic driving system and the HMI system are mounted may be a right-hand drive vehicle or a left-hand drive vehicle. Further, the traffic environment in which the vehicle travels may be a traffic environment premised on left-hand traffic or a traffic environment premised on right-hand traffic. The automatic driving control and the information presentation control according to the present disclosure may be appropriately optimized according to the road traffic law of each country and region, the steering wheel position of the vehicle, and the like.

The controller and the method thereof described in the present disclosure may be implemented by a special purpose computer, which includes a processor programmed to execute one or more functions performed by computer programs. Alternatively, the device and the method thereof according to the present disclosure may be implemented by a dedicated hardware logic circuit. Alternatively, the device and the method thereof according to the present disclosure may be implemented by one or more dedicated computers implemented by a combination of a processor that executes a computer program and one or more hardware logic circuits. The computer program may be stored in a non-transitory tangible computer-readable recording medium as an instruction to be executed by a computer.

What is claimed is:

1. A presentation control device that is used in a subject vehicle capable of traveling by autonomous travel control in which a driver is not obligated to monitor surroundings and controls presentation of information related to the autonomous travel control, the presentation control device comprising:

a control grasping unit that is configured to grasp a plan of automatic lane change made by the autonomous travel control; and a notification implementation unit that is configured to, when a plurality of times of lane change are planned within a predetermined section or within a predetermined time, notify of an execution plan of the plurality of times of the automatic lane change in accordance with a first automatic lane change, wherein when the planned automatic lane change is more than once, the notification implementation unit makes monitoring recommending notification prompting the driver to monitor the surroundings, and when the planned automatic lane change is once, the notification implementation unit restricts execution of the monitoring recommending notification.

2. The presentation control device according to claim 1, wherein the control grasping unit further grasps a standby state of a second or later automatic lane change, when the second automatic lane change is brought into the standby state after completion of the first automatic lane change, the notification implementation unit makes monitoring recommending notification prompting the driver to monitor the surroundings, and when the second automatic lane change is not brought into the standby state after completion of the first automatic lane change, the notification implementation unit restricts execution of the monitoring recommending notification.

3. The presentation control device according to claim 1, wherein the control grasping unit grasps a reason why the plurality of times of the automatic lane change are made, and when the plurality of times of the automatic lane change are planned, the notification implementation unit alters content of notification according to the reason.

4. The presentation control device according to claim 1, wherein when the plurality of times of the automatic lane change are planned within a second predetermined section shorter than a first predetermined section, which is the predetermined section, or within a second predetermined time shorter than a first predetermined time, which is the predetermined time, the notification implementation unit makes driving requesting notification requesting the driver to perform a driving behavior.

5. The presentation control device according to claim 4, wherein when the plurality of times of the automatic lane change are planned within the second predetermined section or within the second predetermined time, the notification implementation unit makes the driving requesting notification requesting the driver to perform at least either acceleration and deceleration operation or steering operation as the driving behavior, and when the plurality of times of the automatic lane change are planned within a section shorter than the first predetermined section and longer than the second predetermined section or within a time shorter than the first predetermined time and longer than the second predetermined time, the notification implementation unit restricts execution of the driving requesting notification related to the acceleration and deceleration operation and the steering operation.

6. The presentation control device according to claim 4, wherein when the plurality of times of the automatic lane change are planned within the second predetermined section or within the second predetermined time, the notification implementation unit makes the driving requesting notification requesting the driver to monitor surroundings as the driving behavior, and when the plurality of times of the automatic lane change are planned within a section shorter than the first predetermined section and longer than the second predetermined section or within a time shorter than the first predetermined time and longer than the second predetermined time, the notification implementation unit restricts execution of the driving requesting notification related to the surroundings monitoring.

7. The presentation control device according to claim 1, wherein when the plurality of times of the automatic lane change are planned within a predetermined section or within a predetermined time, whether movement control in a first mode in which movement is repeated lane by lane is exercised or the movement control in a second mode in which movement is collectively performed for a plurality of lanes is exercised is determined according to a travel environment in which the subject vehicle travels, and when the plurality of times of the automatic lane change are planned, the notification implementation unit further notifies of a mode of the movement control.

8. The presentation control device according to claim 7, wherein the notification implementation unit notifies of execution of the movement control in the first mode when the subject vehicle is traveling on an ordinary road and notifies of execution of the movement control in the second mode when the subject vehicle is traveling on a highway.

9. The presentation control device according to claim 7, wherein the notification implementation unit notifies of execution of the movement control in the first mode when any other vehicle is recognized in a vicinity of the subject vehicle and notifies of execution of the movement control in the second mode when any other vehicle is not recognized in the vicinity of the subject vehicle.

10. A presentation control device that is used in a subject vehicle capable of traveling by autonomous travel control in which a driver is not obligated to monitor surroundings and controls presentation of information related to the autonomous travel control, the presentation control device comprising:

a control grasping unit that is configured to grasp a plan of automatic lane change made by the autonomous travel control; and a notification implementation unit that is configured to, when a plurality of times of lane change are planned within a predetermined section or within a predetermined time, notify of an execution plan of the plurality of times of the automatic lane change in accordance with a first automatic lane change, wherein the notification implementation unit displays bird's-eye view content showing a situation of a vicinity of the subject vehicle by a display device, and when the planned automatic lane change is more than once, the notification implementation unit displays a destination lane image portion reproducing an arrival lane at which arrival is made by repeating the automatic lane change in the bird's-eye view content in accordance with the first automatic lane change.

11. The presentation control device according to claim 2, wherein the notification implementation unit hides an origin lane image portion reproducing an initial lane as a start point of the plurality of times of the automatic lane change in the bird's-eye view content after completion of the first automatic lane change.

12. The presentation control device according to claim 10, wherein the control grasping unit further grasps a possibility of interruption of the automatic lane change, when the possibility of the interruption is present in the first automatic lane change, the notification implementation unit continues display of an origin lane image portion reproducing an initial lane as a start point of the plurality of times of the automatic lane change in the bird's-eye view content, and when the possibility of the interruption is eliminated in the first automatic lane change, the notification implementation unit hides the origin lane image portion.

13. A presentation control device that is used in a subject vehicle capable of traveling by autonomous travel control in which a driver is not obligated to monitor surroundings and controls presentation of information related to the autonomous travel control, the presentation control device comprising:

a control grasping unit that is configured to grasp a plan of automatic lane change made by the autonomous travel control;

a notification implementation unit that is configured to, when a plurality of times of lane change are planned within a predetermined section or within a predetermined time, notify of an execution plan of the plurality of times of the automatic lane change in accordance with a first automatic lane change; and an indicator control unit that, when the plurality of times of the automatic lane change are planned within the predetermined section or within the predetermined time, causes operation of a turn signal lamp indicating of a movement direction of the subject vehicle to continue until a plurality of times of the planned automatic lane change are completed.

14. A non-transitory computer readable storage medium storing a presentation control program that is used in a subject vehicle capable of traveling by autonomous travel control in which a driver is not obligated to monitor surroundings and controls presentation of information related to the autonomous travel control, the presentation control program causing at least one processing unit to perform processing including steps of:

grasping a plan of automatic lane change made by the autonomous travel control; and notifying of an execution plan of the plurality of times of the automatic lane change in accordance with a first automatic lane change when a plurality of times of the automatic lane change are planned within a predetermined section or within a predetermined time, wherein when the planned automatic lane change is more than once, the at least one processing unit makes monitoring recommending notification prompting the driver to monitor the surroundings, and when the planned automatic lane change is once, the at least one processing unit restricts execution of the monitoring recommending notification.

15. A presentation control device that is used in a subject vehicle capable of traveling by autonomous travel control in which a driver is not obligated to monitor surroundings and controls presentation of information related to the autonomous travel control, the presentation control device comprising:

a control grasping unit that is configured to grasp a traveling plan generated at an automatic driving control device exercising the autonomous travel control; and a notification implementation unit that is configured to, when the traveling plan to make a plurality of times of lane change within a predetermined section or within a predetermined time is grasped, make driving requesting notification requesting the driver to perform a driving behavior, wherein when a first lane change is made by the autonomous travel control, the notification implementation unit makes the driving requesting notification requesting the driver to make a second or later lane change by manual operation.

16. The presentation control device according to claim 15, wherein the notification implementation unit switches between and makes the driving requesting notification requesting the driver to make the lane change by manual operation and the driving requesting notification requesting the driver to determine time to start an automatic lane change made by the autonomous travel control.

17. The presentation control device according to claim 16, wherein when execution of the plurality of times of the lane change is planned while the subject vehicle is traveling on an ordinary road, the notification implementation unit makes the driving requesting notification requesting the driver to make the lane change by the manual operation, and when execution of the plurality of times of the lane change is planned while the subject vehicle is traveling on a highway, the notification implementation unit makes the driving requesting notification requesting the driver to determine the time to start.

18. The presentation control device according to claim 15, wherein when a second or later lane change started by the autonomous travel control is brought into a standby state, the notification implementation unit makes the driving requesting notification requesting the driver to make the lane change by manual operation.

19. The presentation control device according to claim 15, wherein when a traffic jam is grasped in a vicinity of the subject vehicle, the notification implementation unit does not make the driving requesting notification related to the plurality of times of the lane change.

20. A non-transitory computer readable storage medium storing a presentation control program that is used in a subject vehicle capable of traveling by autonomous travel control in which a driver is not obligated to monitor surroundings and controls presentation of information related to the autonomous travel control, the presentation control program causing at least one processing unit to perform processing including steps of:

grasping a traveling plan generated at an automatic driving control device that exercises the autonomous travel control; and making driving requesting notification requesting the driver to perform a driving behavior when the traveling plan to make a plurality of times of lane change within a predetermined section or within a predetermined time is grasped, wherein when a first lane change is made by the autonomous travel control, the at least one processing unit makes the driving requesting notification requesting the driver to make a second or later lane change by manual operation.

21. An automatic driving control device comprising:

a control switching unit that is configured to switch between driving assist control in which a driver is obligated to monitor surroundings and autonomous travel control in which the driver is not obligated to monitor the surroundings; and a lane change control unit that is configured to plan execution of automatic lane change of a subject vehicle by the autonomous travel control, wherein when planning a plurality of times of the automatic lane change, the lane change control unit sets a wider interval from a first point at which a first automatic lane change is made to a second point at which a second automatic lane change is made than the interval taken when the plurality of times of the automatic lane change by the driving assist control are planned.

22. The automatic driving control device according to claim 21, further comprising:

a road condition grasping unit that grasps a condition of a road on which the subject vehicle travels, wherein the lane change control unit sets at least either the first point or the second point according to a condition of the road.

23. The automatic driving control device according to claim 22, wherein the road condition grasping unit grasps presence of an avoidance section present in a traveling direction of the subject vehicle, and the lane change control unit sets the first point and the second point with the avoidance section excluded.

24. The automatic driving control device according to claim 21, further comprising:

a different vehicle grasping unit that at least grasps a vehicle behind running behind the subject vehicle, wherein when a distance between the subject vehicle and the vehicle behind is narrower than a predetermined value, the lane change control unit plans execution of the automatic lane change from an initial lane along which the subject vehicle is traveling to an adjacent lane.

25. The automatic driving control device according to claim 24, wherein when passing by the subject vehicle of the vehicle behind is grasped by the different vehicle grasping unit, the lane change control unit plans execution of the automatic lane change to return to the initial lane.

26. A non-transitory computer readable storage medium storing an automatic driving control program causing at least one processing unit to perform processing including steps of:

switching between driving assist control in which a driver is obligated to monitor surroundings and autonomous travel control in which the driver is not obligated to monitor the surroundings;

planning execution of automatic lane change of a subject vehicle by the autonomous travel control; and setting a wider interval from a first point at which a first automatic lane change is made to a second point at which a second automatic lane change is made than the interval taken when a plurality of times of the automatic lane change by the driving assist control are planned when planning the plurality of times of the automatic lane change.

27. A non-transitory computer readable storage medium storing a presentation control program that is used in a subject vehicle capable of traveling by autonomous travel control in which a driver is not obligated to monitor surroundings and controls presentation of information related to the autonomous travel control, the presentation control program causing at least one processing unit to perform processing including steps of:

grasping a plan of automatic lane change made by the autonomous travel control; and notifying of an execution plan of the plurality of times of the automatic lane change in accordance with a first automatic lane change when a plurality of times of the automatic lane change are planned within a predetermined section or within a predetermined time, wherein the at least one processing unit displays bird's-eye view content showing a situation of a vicinity of the subject vehicle by a display device, and when the planned automatic lane change is more than once, the at least one processing unit displays a destination lane image portion reproducing an arrival lane at which arrival is made by repeating the automatic lane change in the bird's-eye view content in accordance with the first automatic lane change.

28. A non-transitory computer readable storage medium storing a presentation control program that is used in a subject vehicle capable of traveling by autonomous travel control in which a driver is not obligated to monitor surroundings and controls presentation of information related to the autonomous travel control, the presentation control program causing at least one processing unit to perform processing including steps of:

grasping a plan of automatic lane change made by the autonomous travel control;

notifying of an execution plan of the plurality of times of the automatic lane change in accordance with a first automatic lane change when a plurality of times of the automatic lane change are planned within a predetermined section or within a predetermined time; and causing operation of a turn signal lamp indicating a movement direction of the subject vehicle to continue until a plurality of times of the planned automatic lane change are completed when the plurality of times of the automatic lane change are planned within the predetermined section or within the predetermined time.

* * * * *